(12) United States Patent
Sobolewski et al.

(10) Patent No.: US 6,392,892 B1
(45) Date of Patent: May 21, 2002

(54) NETWORK ATTACHED DATA STORAGE SYSTEM

(75) Inventors: Zbigniew S. Sobolewski, Longmont; John Spiers, Louisville, both of CO (US)

(73) Assignee: LeftHand Networks, Inc., Boulder, CO (US)

( * ) Notice: Subject to any disclaimer, the term of this patent is extended or adjusted under 35 U.S.C. 154(b) by 0 days.

(21) Appl. No.: 09/681,458

(22) Filed: Apr. 10, 2001

(51) Int. Cl.$^7$ .................................................. H05K 7/14
(52) U.S. Cl. ...................... 361/724; 361/684; 248/634; 312/223.2
(58) Field of Search ........................ 361/724, 684–686, 361/725–727; 714/6; 439/59, 155, 157; 312/223.2; 248/634–636

(56) References Cited

U.S. PATENT DOCUMENTS

| | | | |
|---|---|---|---|
| 5,483,419 A | 1/1996 | Kaczeus, Sr. et al. | 361/685 |
| 5,604,662 A | 2/1997 | Anderson et al. | 361/685 |
| 5,761,033 A | 6/1998 | Wilhelm | 361/686 |
| 5,913,926 A | 6/1999 | Anderson et al. | 714/6 |
| 5,920,709 A | 7/1999 | Hartung et al. | 395/309 |
| 6,018,456 A | 1/2000 | Young et al. | 361/684 |
| 6,215,658 B1 * | 4/2001 | Bodini | 361/695 |
| 6,288,902 B1 * | 9/2001 | Kim et al. | 361/725 |
| 6,302,714 B1 * | 10/2001 | Bolognia et al. | 439/157 |

* cited by examiner

Primary Examiner—Leo P. Picard
Assistant Examiner—Hung Van Duong
(74) Attorney, Agent, or Firm—Holme Roberts & Owen LLP; Christopher J. Kulish, Esq.

(57) ABSTRACT

The present invention is directed to a network attached data storage system. In one embodiment of the invention, the system provides high data density by providing the capability to mount four data storage devices, such as disk drives, in a row that extends across the width of an enclosure that conforms to the 1U specification. In a further embodiment, the system includes a latch that allows a data storage device that is disposed on a carriage to be attached and detached from a receiving bay within a disclosure. The latch includes a sensor that provides an electrical signal which is indicative of when a user is disengaging the latch to remove the data storage device from the enclosure. This signal can be used to prevent any data that is being transferred to or from the data storage device from being lost and/or corrupted during removal of the data storage device. Another embodiment of the system includes an elastomeric vibration dampener that isolates a data storage device from vibrations that can adversely affect the operation of the data storage device. A further embodiment incorporates a electrical connector structure that dampens vibrations between a data storage device and the structure to which it is electrically connected. Yet another embodiment of the system includes an electrical connector that is capable of accommodating the different locations that various manufacturers of IDE disk drives, one type of data storage device that can be placed in the enclosure, place the power and data interfaces on the drive. This ability allows a customer to use IDE drives in the system that have varying locations for their power and/or data interfaces.

56 Claims, 15 Drawing Sheets

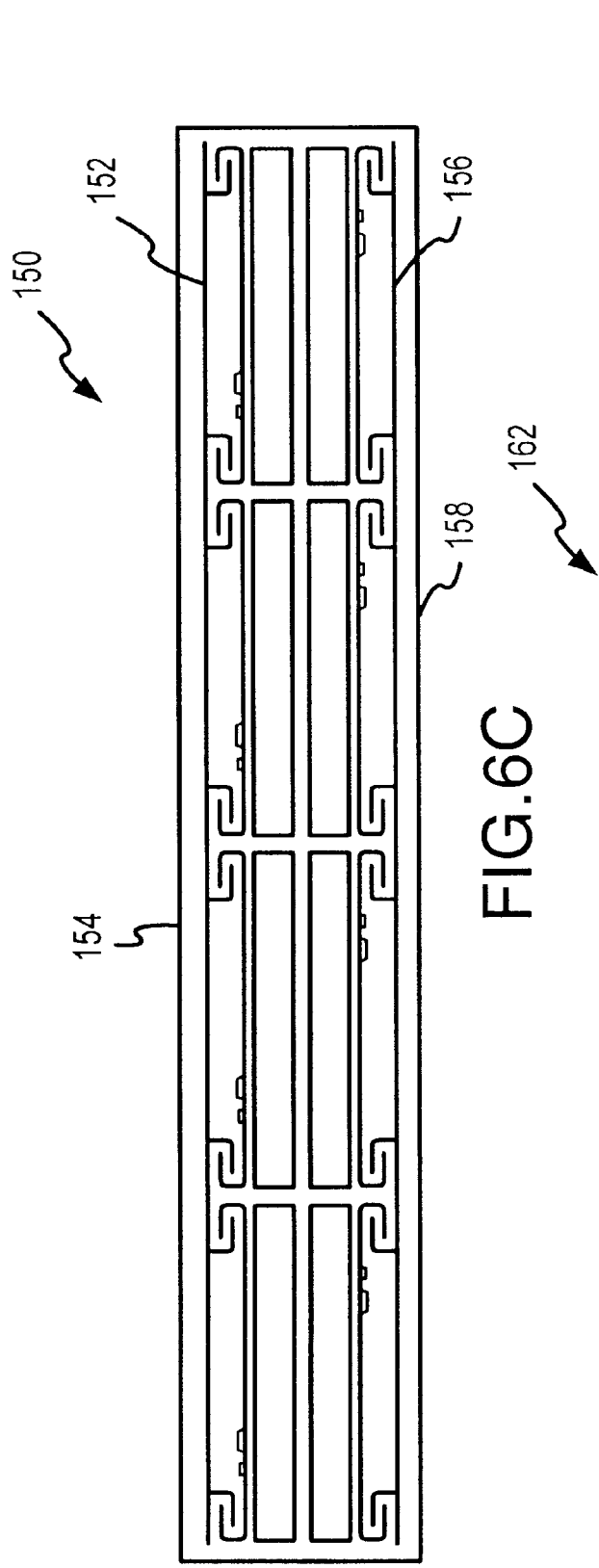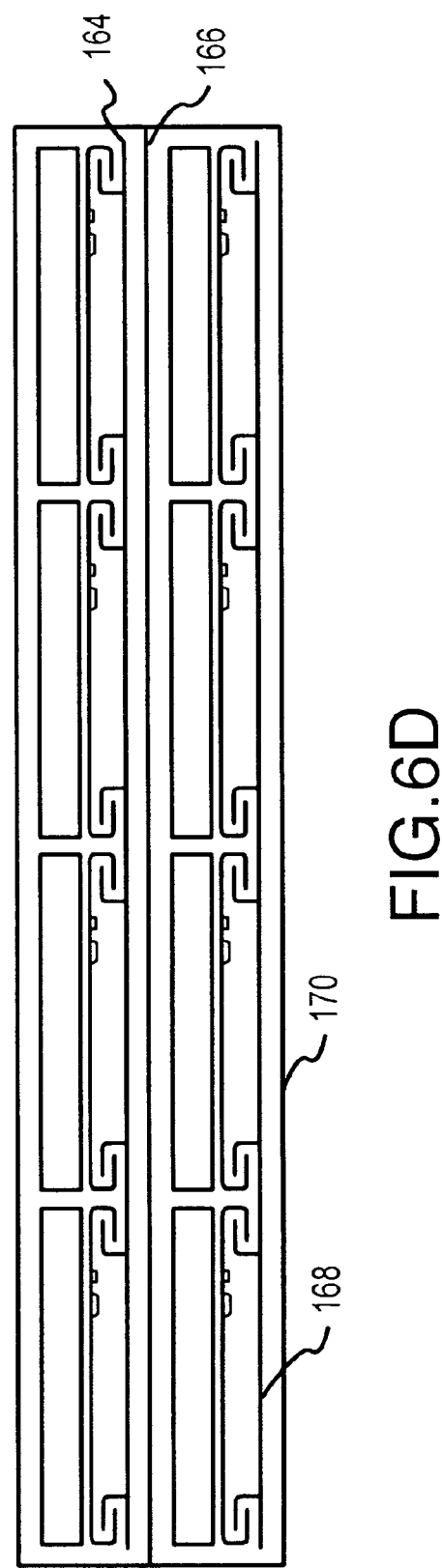

NETWORK ATTACHED DATA STORAGE SYSTEM

FIELD OF THE INVENTION

The present invention relates to computer data storage and, in particular, to a network attached data storage system.

BACKGROUND OF THE INVENTION

A typical computer system includes a processor for executing instructions, a memory for storing the instructions executed by the processor and the results of the execution of instructions, an input peripheral that permits a user to interact with the system (e.g., keyboard, mouse etc.), an output peripheral that also allows a user to interact with the system (e.g., monitor, printer etc.), and a storage peripheral (e.g., disk drive, tape drive etc.) that provides data storage beyond that provided by the memory. In operation, the memory typically contains at least portions of two programs, an operating system program and an application program (e.g., a spreadsheet program). The operating system program provides a number of functions, including functions associated with the management of files, directories of files, and the input and output peripherals associated with computer system.

On a larger scale, computer systems are commonly connected to one another to form computer networks. Common networks include local area networks (LANs) in which the computer systems are networked together are distributed over a relatively small area, such as within an office or a building. Another common network is a wide area network (WAN) in which the computer systems that are part of the network are distributed over a relatively large area. As a consequence, third party communication systems (e.g., telephone and satellite) are commonly required to implement a wide area network.

A fundamental advantage of a computer network is that one computer system can write data to or read data from a memory device associated with another computer system within the network. Typically, the transfer of data from one computer system in a network to another computer system in the network commences with the operating system of the computer system that wants to initiate the transfer data issuing a request that is conveyed over the network communication infrastructure (copper cable, fiber optic cable, radio channel etc.) to the other computer system or systems in the network. The operating system associated with the target computer system (the computer system to or from which data is to be transferred) responds to the request by issuing the appropriate command to the memory device to or from which data is to be transferred. This system for transferring data between computer systems in a network has worked adequately for some time because the network infrastructure was considerably slower in transferring data between the computer systems than the operating system associated with the target computer system differently, the target computer system and, in particular, the operating system of the target computer system was capable of causing data to be transferred to other computer systems in the network at a speed that substantially utilized the available bandwidth of the network infrastructure.

Recently, however, the bandwidth or speed of network infrastructure has increased dramatically. As a consequence, the network infrastructure is no longer the slowest element in the transfer of data between one computer system and another computer system in a computer network. Instead, the target computer system and, more specifically, the operating system of the target computer system has become the slowest element. To elaborate, because the operating system associated with the target computer system is typically processing requests from one or more application programs running on the system, managing the peripherals, and performing other tasks, the operating system can only devote a portion of its time to processing data transfers with other computer systems in the network. Further, the time that the operating system can devote to such transfers is now, usually insufficient to fully utilize the bandwidth or speed at which the network infrastructure is capable of transporting data.

As a consequence of the operating system limitation associated with transferring data between computer systems in a network, a new type of storage system or device has evolved, namely, a network attached storage device. A network attached storage system or device has its own address on the network and is, therefore, directly accessible by the other computer systems in the network. Consequently, when a computer system in a network needs to transfer data to or from a network attached storage device, there is no need to go through an operating system associated with another computer system that is busy processing requests from application programs, peripherals and the like.

SUMMARY OF THE INVENTION

The present invention is directed to a network storage attached system or device that, in one embodiment, provides a high data density by being able to mount a number of data storage devices, such as disk drives, across the width of the system enclosure and provide the ability to access the devices via the front side of the enclosure. Presently, network attached storage devices employ enclosures that come in standardized widths that allow the system to be mounted in a rack that typically includes several other devices. The rack allows several systems or devices to be stacked one on top of another and thereby maximizes the use of available floor space in computer centers and the like. The invention includes a plurality of mounting bays that extend across the width of the enclosure. At least one of the mounting bays includes a rail that extends from either the top or bottom of the enclosure and a carriage for holding a data storage device, such as disk drive. The carriage includes a slot that is adapted to engage the rail in a sliding manner that allows a storage device that is attached to the carriage to be inserted into and removed from the enclosure via the front side of the enclosure. When a storage device is attached to the carriage and the carriage is engaged with the rail, at least one of the rail and carriage are substantially located between the storage device and either the top or bottom surface of the enclosure. In one embodiment, both the rail and the carriage are substantially located between the storage device and either the top or bottom surface of the enclosure. In the case of an 1U enclosure with a standardized width of approximately 480 mm, the mounting bay structure allows four, 3½" disk drives (i.e. disk drives with 3½" diameter disks but housings that have widths of approximately 4") to be established across the width of the enclosure. Presently known network storage devices are only capable of placing three such disk drives across the width of such an enclosure. The mounting bay structure is readily extended to 2U and 3U enclosures that respectively have two and three times the height of a 1U enclosure. Consequently, a 2U enclosure can accommodate eight, 3½" disk drives, and a 3U enclosure can accommodate twelve, 3½" disk drives. The ability to insert and remove a carriage from the enclosure via an opening in the front side of the enclosure allows data storage devices to be moved into and out of the enclosure without having to remove the cover of the enclosure or otherwise disassemble the enclosure. Further, by avoiding such disassembly, the need to remove the system from any rack in which it is mounted is also avoided. Further, the carriage can be fixed in the enclosure with a latching system that relieves the user from having to use tools to install or remove the carriage.

Another embodiment of the invention is directed to a network attached storage system that is able to detect when a data storage device is likely to be removed from the system enclosure so that action can be taken to prevent the loss of any data being transferred to or from the device. In one embodiment, the system includes an enclosure, a mounting bay that includes a receiving structure and a carriage for holding a data storage device, and a latch which, in addition to allowing a carriage for a data storage device to be attached to and detached from the enclosure of the system, provides the ability: (1) to detect when the latch is being actuated by a user such that it is likely that the user is going to remove the carriage and any associated storage device from the enclosure; and (2) to produce a signal that allows remedial action to be taken to prevent the loss or corruption of any data being transferred to or from the storage device. In one embodiment, the latch includes a pin and an actuator that can be manipulated by a user to either engage the pin and thereby attach the carriage to the enclosure, or disengage the pin and thereby detach the carriage from the enclosure. Also part of the latch is a sensor that is capable of: (1) detecting movement of the actuator that is indicative of the possible removal of the carriage and any associated storage device from the enclosure; and (2) generating an electrical signal representative of the detected movement. Further, the sensor is adapted so that the detection of the noted movement and generation of the electrical signal occurs before any removal of the carriage and any associated storage device severs the electrical connections to the storage device, thereby allowing measures to be taken to prevent the loss or corruption of any data being transferred to or from the device. In one embodiment, the sensor detects the movement of the latch actuator between two points, both points associated with positions of the actuator where the storage device is still electrically connected to, for example, a buss card but indicative of the likely removal of the device from the enclosure. For instance, the first point could be a point at which the latch actuator has fully engaged the latch pin and the second point could be a point at which the latch actuator has only partially engaged the latch pin but at which the electrical connections to the storage device are still intact. In one embodiment, an electro-mechanical sensor is utilized that mechanically senses the change in position of the actuator and generates an electrical signal representative of the movement of the actuator that is indicative of the likely removal of the carriage from the enclosure. In another embodiment, an optical sensor is used to optically sense the change in position of the actuator and generates a signal indicative of a change in position of the actuator that is indicative of the likely removal of the carriage from the enclosure.

A further embodiment of the network attached storage system reduces or dampens vibrations that may adversely affect the operation of the data storage device or devices that are housed within the enclosure of the system. In one embodiment, system includes an enclosure, a mounting bay that includes a receiving structure and a carriage for holding a data storage device, and a vibration dampener for dampening vibrations between the carriage and the data storage device. In one embodiment, the vibration dampener includes an elastomeric mount that extends between the carriage and the data storage device. In one embodiment, the elastomeric mount includes a plurality of elastomeric tori. A hole in each of the tori accommodates a screw or other fastener that is used to attached the storage device to the mount. Each of the tori are also configured to be attached to the carriage. In one embodiment, each of the tori include a circumferential slit that engages an opening or notch in the carriage such that a first portion of the torus extends between the carriage and any data storage device and a second portion of the torus extends between the carriage and at least a portion of the screw or other fastener. In yet a further embodiment, the elastomeric mount includes a cylinder that is located within the hole of each of the tori and prevents the screw or other fastener from abrading the torus. In another embodiment, the vibration dampener includes two, torus-like structures that are connected to one another by a bridge. When the torus-like structures are engaging open-sided notches in the carriage, the bridge creates a tension between the two, torus-like structures that prevents the torus-like structures from slipping out of the notches. In one embodiment, each of the two, torus-like structures includes a flat side that is substantially flush with the edge of the carriage when the torus-like structures are seated in the notches. As a consequence, the torus-like structures occupy little, if any, of the space between adjacent carriages or between a carriage and a side wall of the enclosure.

Yet another embodiment of the network attached storage system attenuates vibrations that would otherwise be transmitted by the electrical connector or connectors that extend between a storage device in the enclosure and a buss card or other electrical device that is also located within the enclosure and communicates with the storage device. In one embodiment, the network storage system includes an enclosure, a mounting bay within the enclosure that includes a receiving structure and a carriage for holding the data storage device, and a vibration dampener that includes an electrical connector that extends between a data storage device and a buss card or other electrical device. In one embodiment, the electrical connector includes an electrical conductor that incorporates a U-shape that serves to dampen vibrations between the storage device and the buss card or other electrical device. In yet another embodiment, a plurality of flat cable connectors are utilized that contribute to the dampening of vibrations. Another embodiment combines the vibration dampening provided by the electrical connector and the vibration dampening provided by the elastomeric mount to substantially isolate a storage device from all the likely sources of vibration, namely, vibrations transmitted by the enclosure through the mounting structure and vibrations transmitted through the electrical connections between the storage device and its associated buss card.

Yet another embodiment of the network attached storage system provides the ability to readily accommodate types of storage devices that have electrical interfaces whose locations vary from manufacturer to manufacturer. For example, IDE disk drives must conform to an industry specification requiring two electrical interfaces located on the back wall of the drive, one for transmitting power to the drive and the other for transmitting data between the drive and a buss card. However, the specification does not require the connectors to be placed at any specific locations on the back wall of the drive. Consequently, there is substantial variation in the locations of these interfaces from manufacturer to manufacturer. One way to accommodate this type of variability in the location of the electrical interfaces in a network attached storage system is to provide separate buss cards for each variation in the location of the electrical interface.

Consequently, if one storage device is replaced with another storage device that has an electrical interface in a different location, the old buss card is replaced with a new buss card that has an electrical interface that is positioned to mate with the electrical interface of the new storage device. The present invention, however, avoids the need to replace the buss cards. In one embodiment, the network storage device includes an enclosure, a mounting bay that includes a receiving structure and a carriage for accommodating a data storage device with an electrical interface, and an intermediate electrical connector that is associated with the carriage and capable of accommodating the noted variation in the position(s) of electrical interfaces(s). In the case of IDE disk drives, an electrical connector is provided that includes first and second connectors for respectively engaging the data and power interfaces of the drive, a third connector for engaging the buss card, and two flexible electrical conductors that extend between the first and second connectors and the third connector with at least one of the electrical conductors including a plurality of electrical conductors that are separated from one another. The flexible connector associated with the connector that engages the data interface of the drive includes a plurality of flat cable conductors. The plurality of flat cable conductors allow the connector to be readily positioned to accommodate variations in the positions of the data interface, especially when conductors are relatively short (e.g. a few inches). Moreover, the plurality of flat cable conductors also facilitate the attenuation of vibrations that could otherwise adversely affect the performance of the data storage device. In one embodiment, the plurality of flat cable conductors are realized by splitting a single, multi-conductor flat cable, except for the ends, which are attached to connectors In operation, the first and second connectors can be positioned to address variations in the positions of the power and data interfaces on the IDE disk drives of various manufacturers. The third connector, however, remains substantially stationary but positioned so as to interface with the electrical interface of the buss card. In one embodiment, the flexible electrical conductor incorporates a U-shape that contributes to the attenuation or dampening of vibrations that could adversely affect the operation of a data storage device associated with the carriage.

BRIEF DESCRIPTION OF THE DRAWINGS

FIGS. 6C and 6D respectively illustrate two different ways of mounting eight, 3½" disk drives in two rows, each with four drives, in a 2U enclosure;

DETAILED DESCRIPTION

Figure 1:
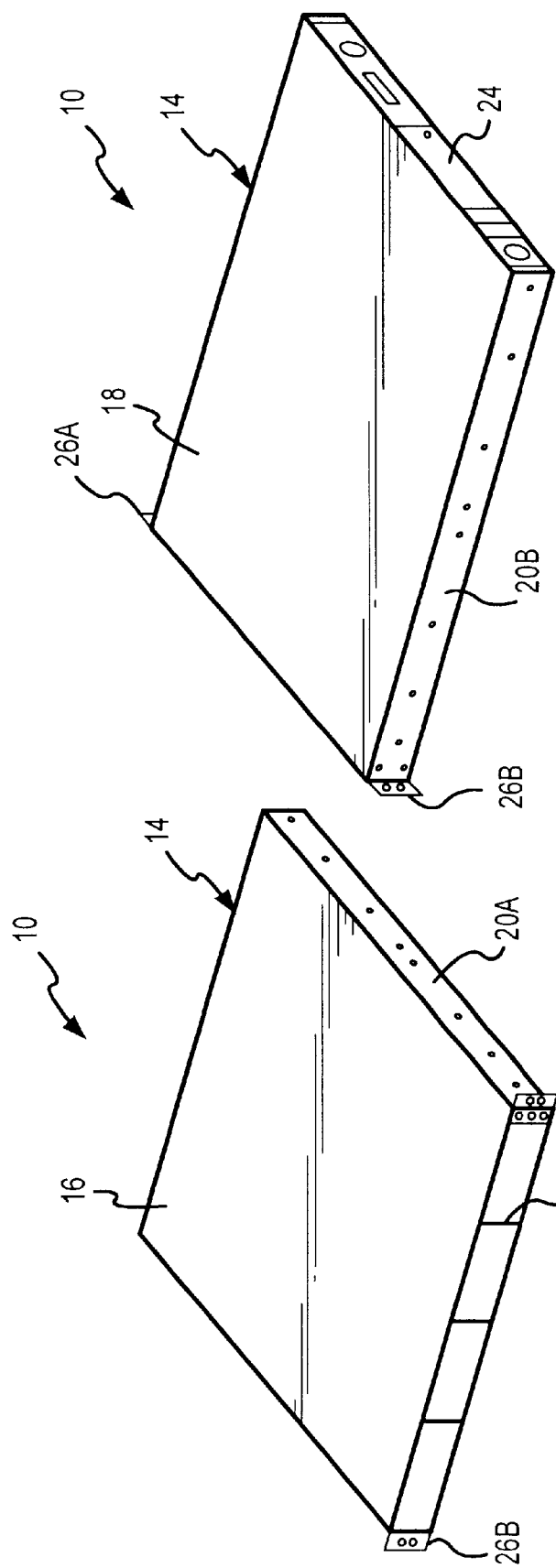
FIG. 1A is a front-side perspective view of a network attached storage system according to the present invention.
FIG. 1B is a rear-side perspective view of the network attached storage system shown in FIG. 1A.

FIGS. 1A and 1B illustrate an embodiment of a network attached storage system 10, which is hereinafter referred to as system 10. The system 10 includes an enclosure 14 for housing the other elements of the system 10. The enclosure includes a top wall 16, a bottom wall 18 that is substantially parallel to the top wall 16, a first side wall 20A, a second side wall 20B that is substantially parallel to the first side wall 20A, an open front wall 22 that defines four openings through which data storage devices can be inserted into and removed from the enclosure 14; and a rear wall 24 that provides a mounting structure for various electrical and mechanical interfaces. The rear wall 24 provides a mounting structure for interfaces for: (1) conveying data between the system 10 and a computer network; (2) providing power to the system 10; and (3) venting heat produced by the system 10.

The enclosure 14 is also suitable for mounting in a computer rack that is capable of storing the system 10 and other systems or computer devices in a vertical stack. In this regard, the illustrated enclosure 14 conforms to the EIA-310-D standard, which specifies the dimensions for mounting systems or devices in a rack with a specified width. Specifically, the enclosure 14 has a width of approximately 17.7 in./450 mm (not including any mounting flanges). The height of the enclosure 14 is 1.75 in./44.45 mm, which characterizes the enclosure as a 1U enclosure. The depth of the enclosure 14 is approximately 20 in./508 mm. To facilitate the mounting of the system 10 to a rack, a pair of flanges 26A, 26B are provided that each include a pair of holes that accommodate bolts that are used to mount the system 10 to a rack.

Figure 2:
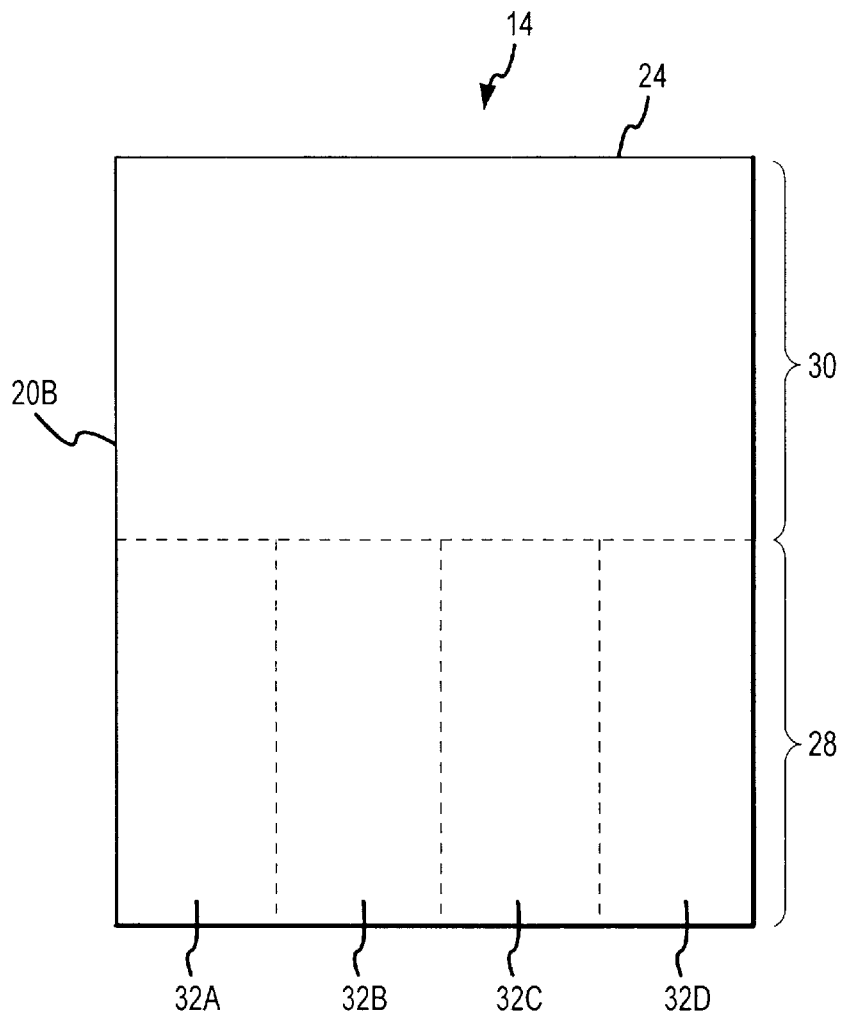
FIG. 2 illustrates the general layout of the interior of the enclosure of the system shown in FIGS. 1A and 1B.
Figure 3:
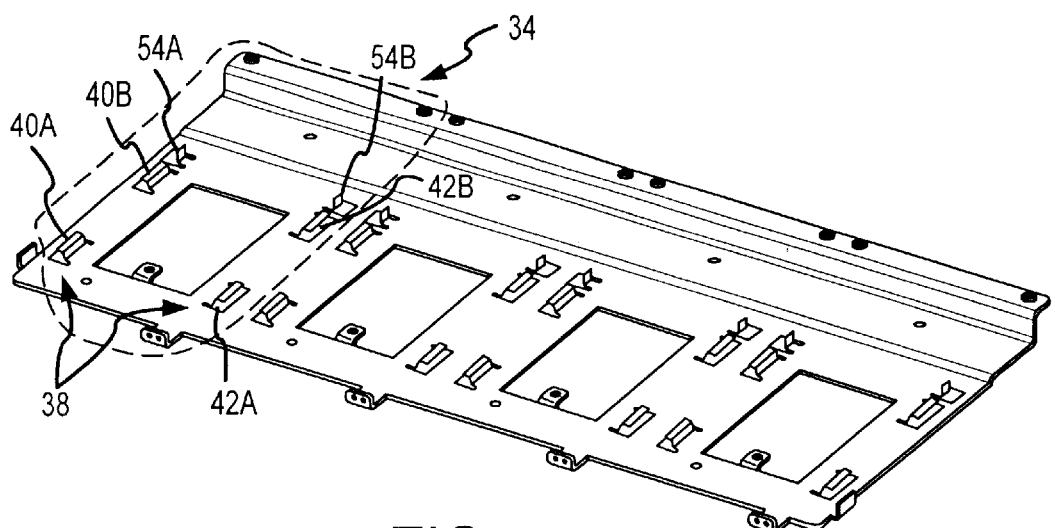
FIG. 3 illustrates the receiving structure portion of a mounting bay.
Figure 4:
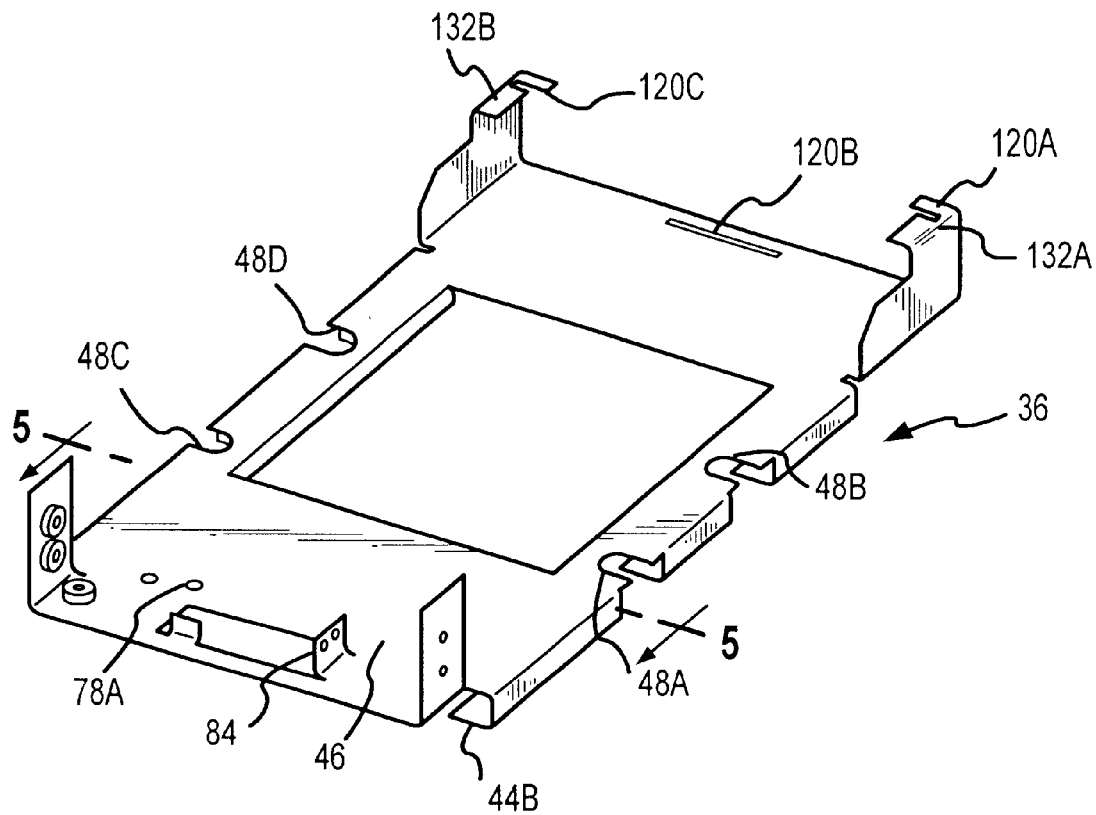
FIG. 4 illustrates the carriage portion of a mounting bay.
Figure 5:
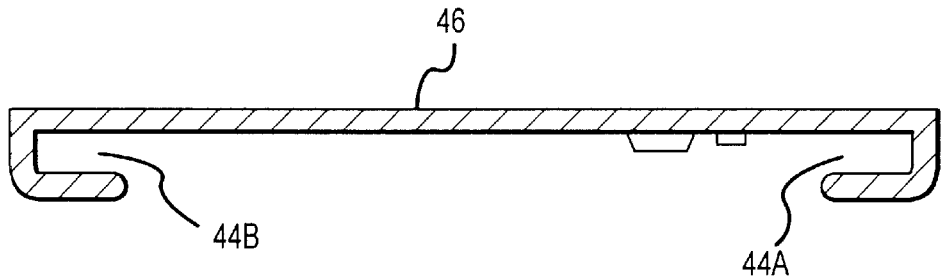
FIG. 5 is a cross-sectional view of the carriage portion of the mounting bay illustrated in FIG. 4.

With reference to FIG. 2, the layout of the various components contained within the enclosure 14 is described. The enclosure 14 includes a mounting bay 28 for accommodating one or more data storage devices and an electronics bay 30 for housing power supplies, cooling fans, processing and memory circuitry etc. Typically, a memory device within the electronics bay is capable of being programmed with the desired network address of the system 10. In the illustrated embodiment, the mounting bay 28 is divided into four, subsidiary mounting bays 32A–32D, each capable of accommodating a 3½" disk drive.

With reference to FIGS. 3–6, the mounting bay 28 structure is described in greater detail. Generally, the mounting bay 28 provides the ability to mount as many data storage devices as possible in a row extending across an enclosure of given width by providing a mounting structure that avoids establishing any portion of the structure in the spaces between the data storage devices or between the data storage devices and the side walls 20A, 20B of the enclosure 14. In the illustrated embodiment, the mounting bay 28 includes the four, subsidiary mounting bays 32A–32D that are substantially identical to one another. As a consequence, only one of the four, subsidiary mounting bays 32A–32D is described in detail. Generally, the mounting bay 32A includes a receiving structure 34 that is attached to or part of the enclosure 14 and a carriage 36 for holding a data storage device and engaging the receiving structure 34. The carriage 36 can also be disengaged from the receiving structure 34 to remove, for example, a data storage device that is attached to the carriage 36 from the system 10. The receiving structure 34 and the carriage 36, when engaged with one another, have a width that is substantially equal to the width of the data storage device for which the carriage 36 is designed. As a consequence, implementation of mounting bays 32A–32D require the use of little, if any, of the lateral space available in the enclosure 14. This, in turn, allows the number of data storage devices that can be established across the width of the enclosure to be maximized, whether the width of the devices is the same from device to device or different.

In the illustrated embodiment, the receiving structure 34 includes a rail structure that is formed of opposing L-shaped legs, one leg realized by a first pair of L-shaped tabs 40A, 40B and the second leg realized by a second pair of L-shaped tabs 42A, 42B. The carriage 36 includes a pair of opposed U-shaped channels 44A, 44B that allow the carriage 36 to be slid on and off of the rail structure to mount and dismount the carriage 36 via an opening in the open front wall 22. Extending between the U-shaped channels is a floor 46 for supporting a data storage device. Four notches 48A–48D are disposed in the U-shaped channels 44A, 44B for accommodating screws that engage holes disposed in the mounting surface of a data storage device and facilitating access to any such screws or other fastening devices. A pair of blocks 54A, 54B are provided in the receiving structure 34 to cooperate with a pair of cutouts associated with the U-shaped channels 44A, 44B to facilitate lateral alignment of the carriage 36 within the enclosure 14 during insertion of the carriage 36 so that an electrical connector associated with the carriage 36 can mate with an electrical connector associated with a buss card.

Figure 6A:
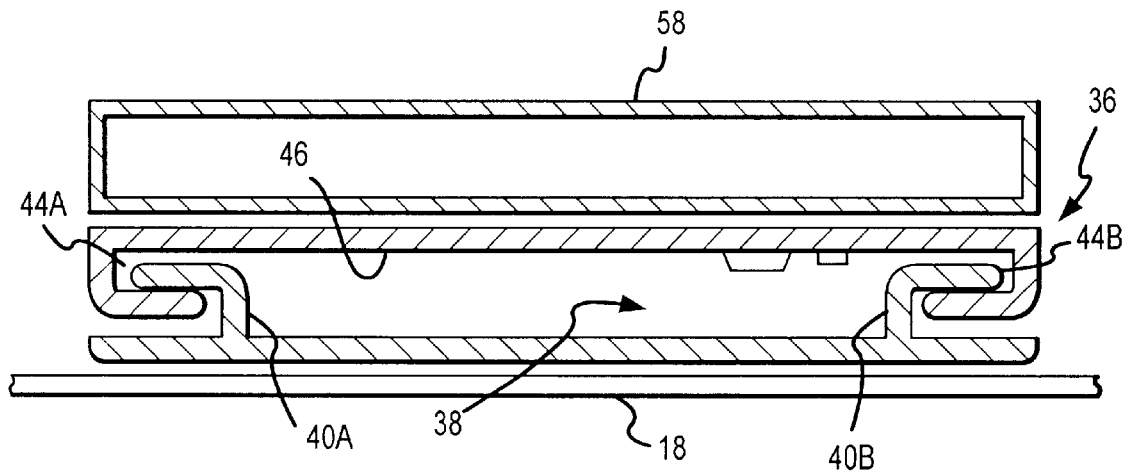
FIG. 6A is a cross-sectional view of a data storage device attached to the carriage portion of the mounting bay and the carriage, in turn, attached to the rail structure of the mounting bay.
Figure 6B:
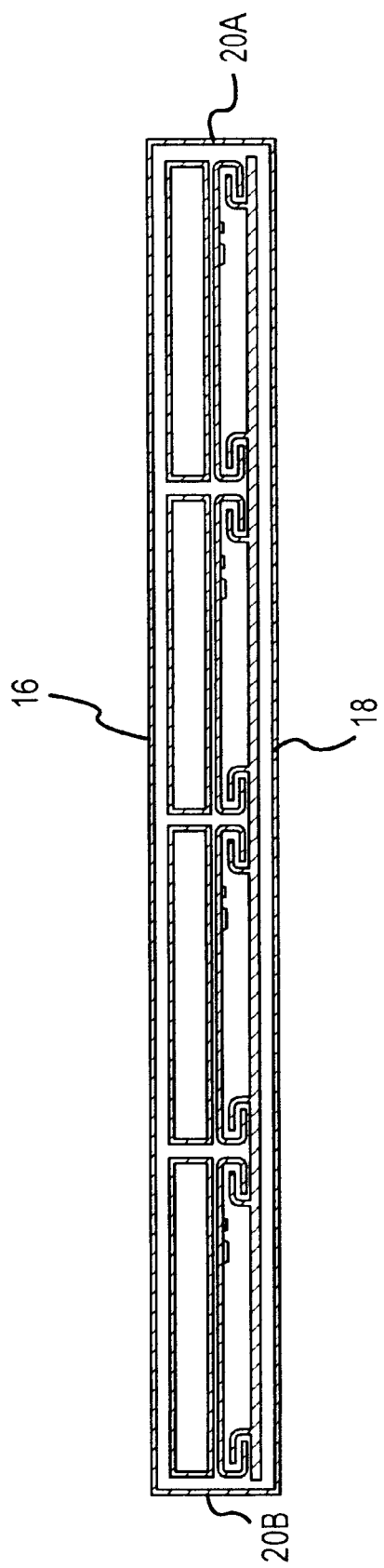
FIG. 6B is a cross-sectional view of the mounting bay of the 1U enclosure shown in FIG. 1 with four, 3½" disk drives mounted across the width of the enclosure.
Figure 7A:
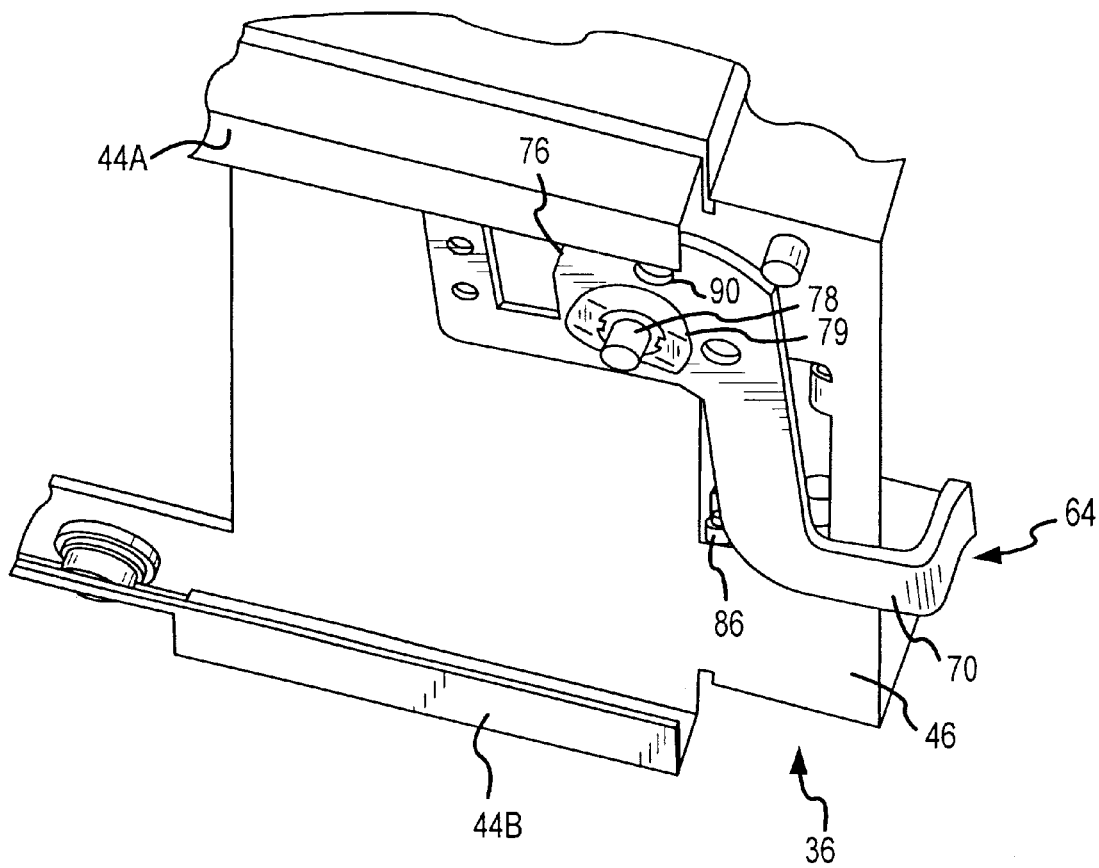
FIGS. 7A–7B show the latch actuator and sensor portions of a latch mechanism that is used to fix a carriage in the enclosure of the system illustrated in FIGS. 1A and 1B.
Figure 7B:
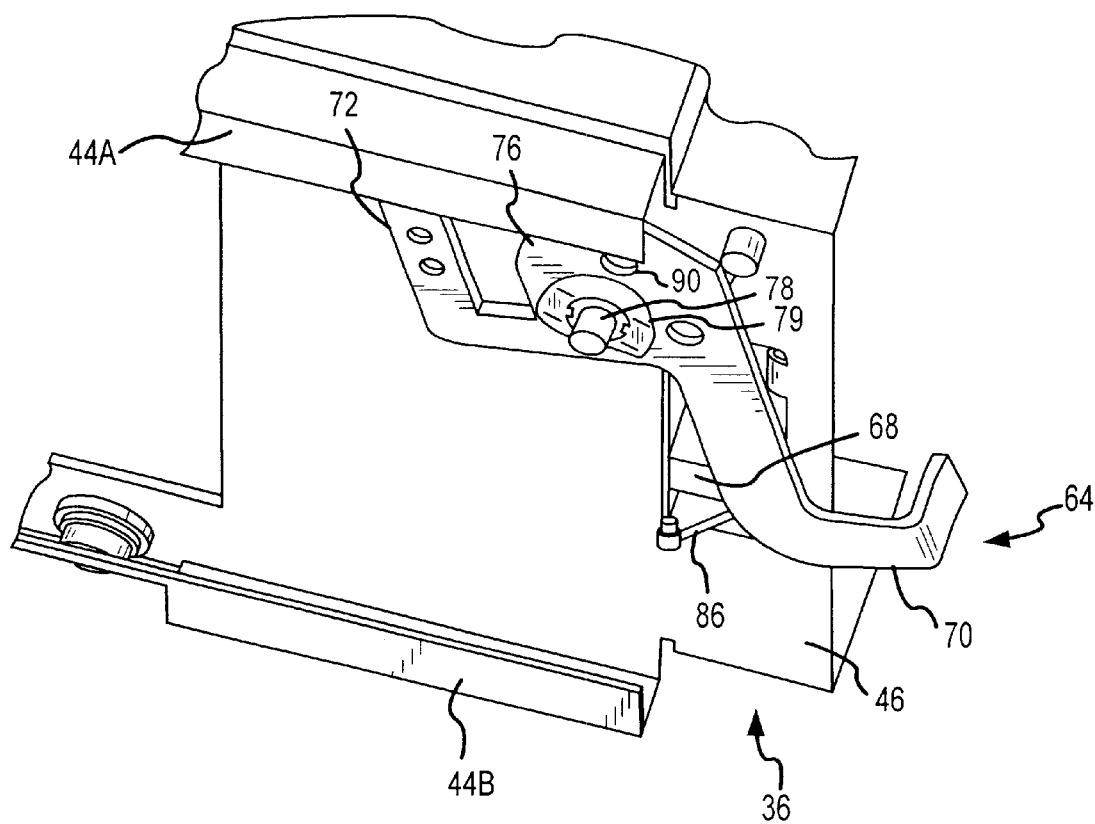
Figure 7C:
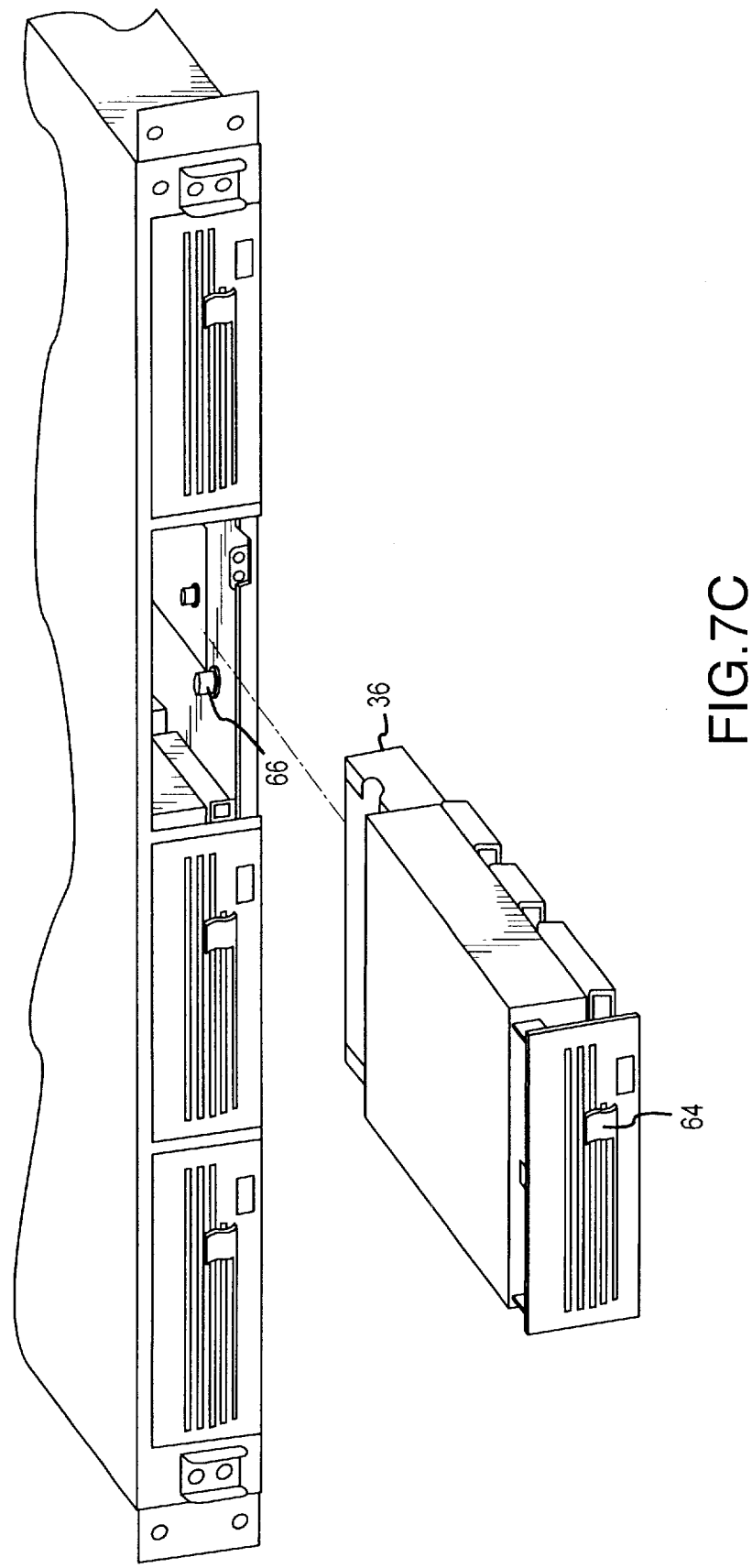
FIG. 7C illustrates the location of the latch pin that is engaged by the latch mechanism shown in FIGS. 7A and 7B.
Figure 7D:
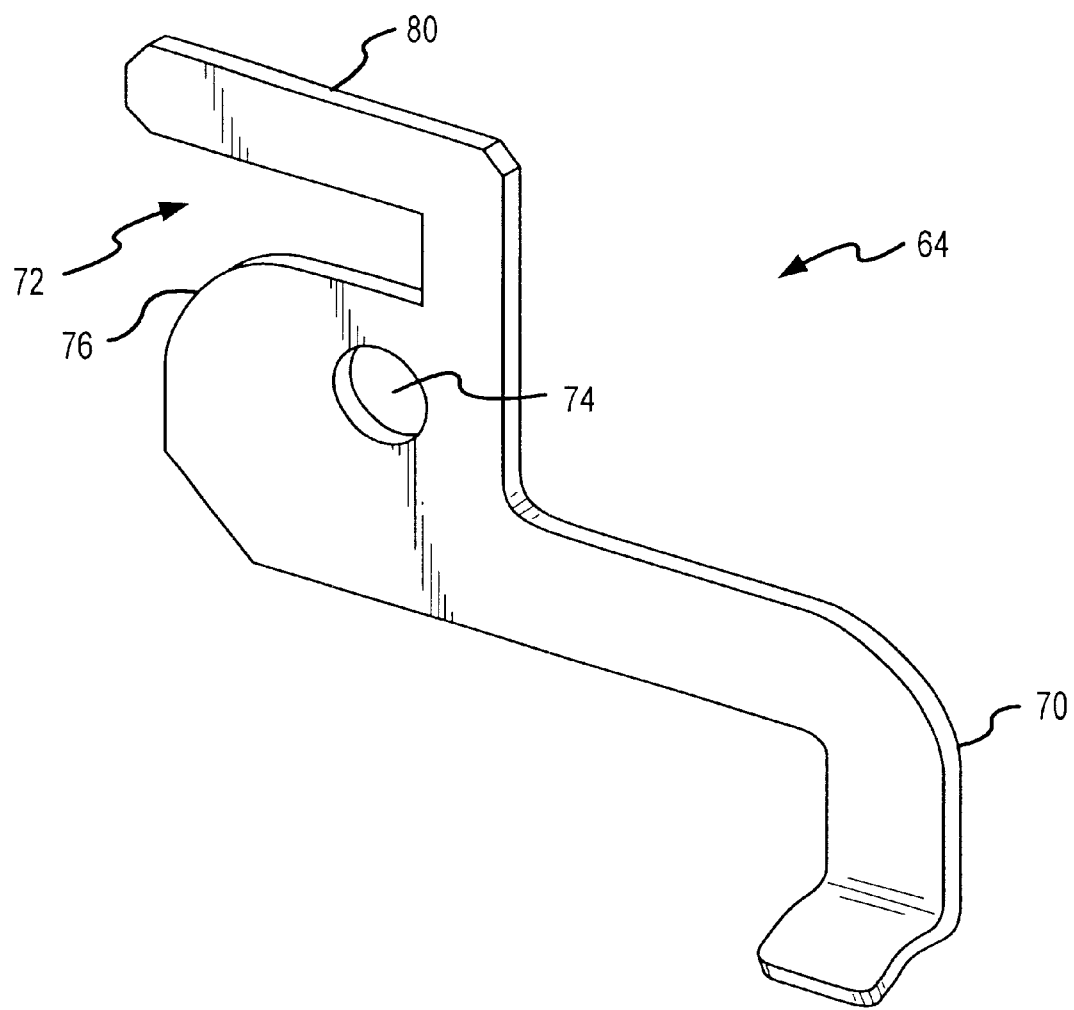
FIG. 7D is a free body diagram of the latch actuator shown in FIGS. 7A and 7B.

FIG. 6A is a cross-sectional view of a data storage device 58 mounted on the carriage 36 and the carriage 36 engaged with the rail structure. As can be seen, the carriage 36 and rail 38 are substantially entirely located between the data storage device 58 and the bottom wall 18 of the enclosure. Stated differently, the carriage 36 and rail 38 do not extend substantially beyond the width of the data storage device 58. As a consequence, the carriage 36 and rail 38 allow the data storage devices to be positioned very close to one another and thereby maximizes the number of data storage devices that can be established across the width of the enclosure 14. In this regard, FIG. 6B is a cross-sectional view of the 1U enclosure shown in FIG. 1 with four data storage devices attached to four carriages that are, in turn, engaged to four rail structures that are established across the width of the 1U enclosure. The data storage device, in the illustrated embodiment, are 3½" IDE disk drives.

FIG. 6C is a cross-sectional view of a network attached storage system with a 2U enclosure 150 (which has twice the height of the 1U enclosure 14, i.e., a height of 3.5 in/88.9 mm) showing the mounting of eight, 3½" disk drives within the enclosure using two receiving structures, a first receiving structure 152 attached to the top wall 154 and a second receiving structure 156 attached to the bottom wall 158. Four carriages, each shown as holding a 3½" disk drive, engage each of the receiving structures. FIG. 6D illustrates a 2U enclosure 162 that is also capable of mounting eight, 3½" disk drives using two receiving structures, a first receiving structure 164 attached to an intermediate floor 166 and a second receiving structure 168 attached to a bottom wall 170. A 3U enclosure capable of mounting twelve, 3½" disk drives utilizes receiving structures that are attached to the enclosure in the manner illustrated with respect to the 2U enclosure shown in FIG. 6D (i.e., with one receiving structure attached to either a bottom or top wall and the other two receiving structures attached to intermediate floor or ceiling surfaces) or in a manner that combines the attachments shown in FIGS. 6C and 6D (i.e., with one receiving structure attached to each of the top wall and bottom wall and the third receiving structure attached to an intermediate floor or ceiling surface).

It should be appreciated that while the receiving structure 34 is shown as incorporating a rail structure and the carriage as incorporating a slot structure, a number of variations are possible that facilitate close positioning of the data storage devices. For instance, the close positioning can be realized with a slot structure that is associated with the receiving structure and a rail structure that is associated with the carriage. Changes in the shapes, locations, orientations and/ or materials used to realize the rail and slot structures are also feasible. For instance, (1) the rail structure can be realized with a T-shaped structure, as opposed to two L-shaped structures; (2) the illustrated L-shaped legs used to realize the rail structure can be re-oriented to face inward rather than outward; (3) the illustrated L-shaped legs used to realize the rail structure can be replaced with separate components that are attached to the enclosure rather than stamped from a piece of metal; (4) the L-shaped legs can also be realized in the enclosure itself rather than using a separate piece of metal. Many other variations are also feasible.

With reference to FIGS. 7A–7D, a latch mechanism for attaching the carriage 36 to the enclosure 14 and providing a signal that allows precautionary measures to be taken when the carriage 36 and an associated data storage device are likely to be removed from the enclosure 14. Generally, the latch mechanism includes a latch actuator or lever 64, a latch pin 66 that is engaged by the latch actuator 64 when the carriage 36 is being attached to the enclosure, and a sensor 68 for generating a signal indicative of the likely removal of the carriage 36 and any associated data storage device from the enclosure 14. In the illustrated embodiment, the latch actuator 64 includes a handle 70, a slot defining structure 72 for engaging the latch pin 66, a pivot hole 74 for accommodating a pin or rivet that is used to attach the actuator 64 to the carriage, and a camming surface 76 that serves, during insertion of the carriage, to prevent insertion of the carriage beyond a certain point by contacting the latch pin 66 and, during extraction of carriage, to engage the latch pin 66 so as to push the carriage 36 away from the enclosure 14. The actuator 64 is attached to the underside of the floor 46 of the carriage 36 such that the actuator 64 can rotate about a pivot pin 78 that extends through a hole 78A (FIG. 4) in the floor of the carriage. A spring washer 79 is associated with the pivot pin 78 and serves to create friction that allows the actuators 64 to remain in a desired position. The latch pin 66 is operatively attached to and extends upwards from the bottom wall 18 of the enclosure. The sensor 68 is attached to a standard 84 (FIG. 4) that extends upwards from the floor 46 of the carriage 36. The sensor 68 includes a switch lever 86 that extends through hole 88 in the floor 36 and allows the switch lever 86 to sense movement of the actuator 64.

To attach the carriage 36 to the enclosure 14, the actuator 64 is rotated counter-clockwise such that a finger 80, which is part of the slot defining structure 72, can move past the latch pin 66 and the latch pin 66 can engage the camming surface 76. The actuator 64 is sufficiently held in this position by the friction created by the spring washer 79. The carriage 36 is then positioned to engage the rail 38 and inserted until contact between the camming surface 76 the latch pin 66 prevents further insertion. At this point, the latch actuator 64 is rotated in a clockwise direction so that the slot defining structure 72 engages the latch pin 66 and until further rotation is prevented by the base of the finger 80 contacting the latch pin 66 . The actuator 64 is held in this position by the friction provided by the spring washer 79.

When a user desires to remove the carriage 36 from the enclosure, the user manipulates the handle 70 so as to rotate the actuator 64 in a counter-clockwise direction about the pivot point 78. This rotation causes the camming surface 76 to push against the latch pin 66 such that carriage 36 is pushed away from the enclosure. In being pushed away, the electrical connections between any data storage device being held by the carriage 36 and the remainder of the system 10 are ultimately severed. If these electrical connections are severed while the data storage device is involved in a data transfer operation, data can be lost or corrupted. The sensor 68 provides a signal that is used to prevent any such loss or corruption. Specifically, the sensor 68 senses the counter-clockwise rotation of the actuator that is indicative of the possible removal of the carriage 36 and any associated data storage device. Moreover, this movement is sensed while the electrical connections are still intact and while there is sufficient time to take action to prevent the loss or corruption of data. In the illustrated embodiment, the movement of the switch lever 86 from a first position to a second position causes the sensor 68 to generate the signal that is used to take protective measures to be generated. The first position of the switch lever 86 is representative of a first positional relationship between the actuator 64 and the latch pin 66 that occurs when the electrical connections are still in place. For example, the first position could be representative of the actuator 64 being positioned such that the base of the finger 80 is engaging the latch pin 66, and the second position could be representative of a slight clockwise rotation of the actuator 64 relative to the first position. In any event, once the switch lever 86 has rotated from the first position through the second position, the sensor 68 generates the signal that is used to initiate data loss prevention measures.

Figure 8:
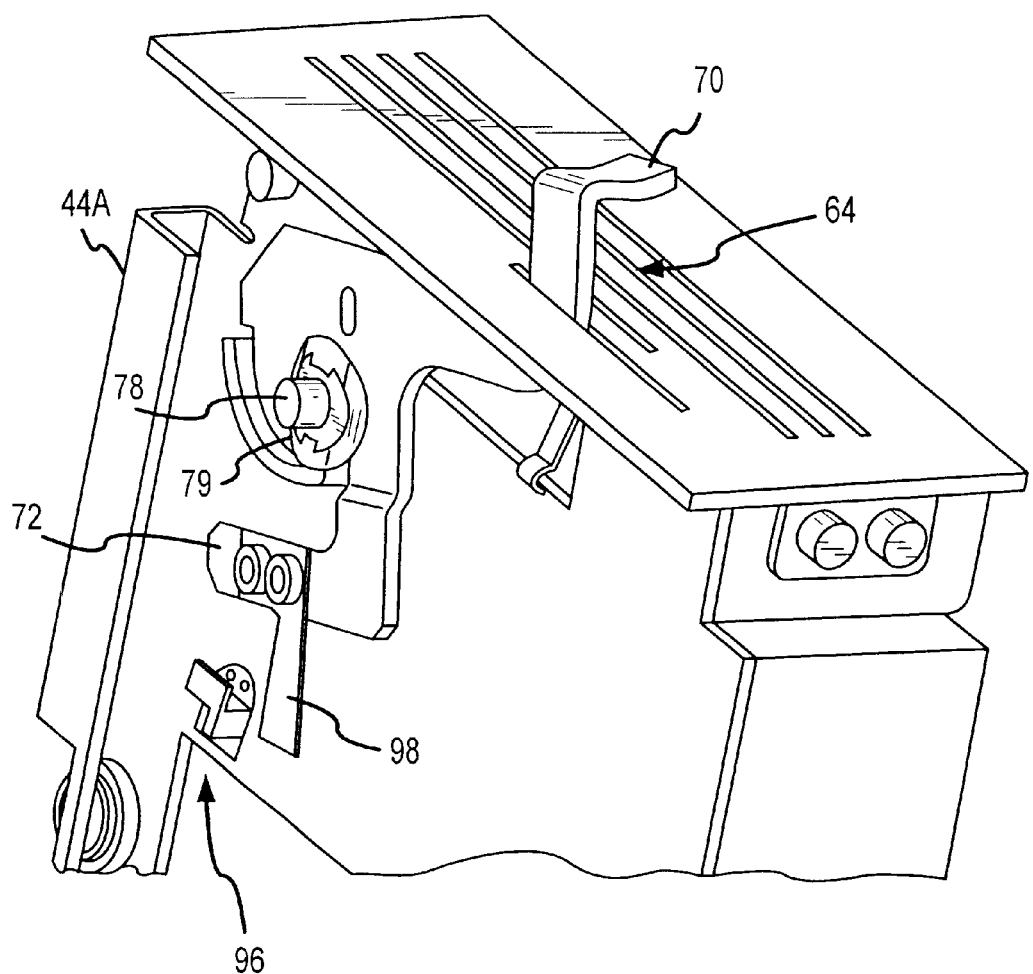
FIG. 8 illustrates a second latch mechanism that utilizes an electro-optical sensor.

With reference to FIG. 8, a second embodiment of the latch mechanism is described that is substantially identical to the first embodiment of the latch mechanism, except for the sensor mechanism. Due to this substantial similarity, the parts of the second embodiment of the latch mechanism that are substantially similar to those in the first embodiment are given the same reference number as those parts in the first embodiment. The latch mechanism includes an electro-optical sensor 96 detect the motion of the actuator 64 that is indicative of the possible removal of the carriage 36 and any associated data storage device from the enclosure 14. The electro-optical sensor includes an LED for emitting a beam of light and an optical detector that is aligned with the LED and outputs a first signal if the beam of light is detected and a second signal if the beam of light is not detected. The LED is separated from the optical detector by a space through which a portion of the actuator 64 can pass. If the portion of the actuator is not in the noted space, the optical detector receives the beam of light output by the LED and outputs the first signal. If the portion of the actuator is in the space, the portion of the actuator blocks the beam of light from reaching the optical detector and the detector outputs the second signal. The portion of the actuator 64 that is capable of blocking the beam of light is a flag 98. Other portions of the actuator can also be used to block the beam of light if desired. Other electro-optical sensors capable of sensing a change in the position of the actuator are also feasible, including but not limited to a sensor with an optical detector positioned to receive a reflected beam of light and a sensor that employs multiple light emitting elements in conjunction with multiple detectors.

In operation, the sensor 96 detects the counter-clockwise rotation indicative of the possible removal of the carriage while any electrical connections to a data storage device are intact and in time for precautionary measures to be taken to prevent the loss or corruption of any data transfer involving a data storage device associated with the carriage 36. In the illustrated embodiment, the change in signal output by the electro-optical sensor 96 from the second signal to the first signal is used to initiate the necessary protective actions. To elaborate, the flag 100 is initially disposed in the space between the LED and the optical detector. This can occur when the actuator 64 has been fully rotated in the clockwise direction or upon subsequent counter-clockwise rotation. In any event, the flag 100 blocks the beam of light from reaching the detector and, as a consequence, the detector outputs the second signal. Subsequently, counter-clockwise rotation of the actuator 64 eventually causes the flag 100 to pass through the space between the LED and the optical detector. When this happens, the optical detector receives the beam of light output by the LED and, as a consequence, the signal output by the optical detector transitions from the second signal to the first signal. This transition is then used to initiate actions designed to prevent the loss or corrupt of any data being transferred to or from any data storage device associated with the carriage 36.

While the illustrated embodiment of the latch mechanism shows the latch pin 66 being operatively attached to the enclosure 14 and the latch actuator 64 associated with the carriage 36, the latch pin 66 and latch actuator 64 can be located elsewhere. For instance, the latch pin can also be associated with the carriage and the latch actuator can be operatively attached to the enclosure. Furthermore, latching mechanisms other than the illustrated slot/pin latch mechanism can be utilized, provided some operation of the mechanism that is indicative of the possible removal of the carriage and any associated data storage device can be sensed in sufficient time to take precautionary measures.

Figure 9A:
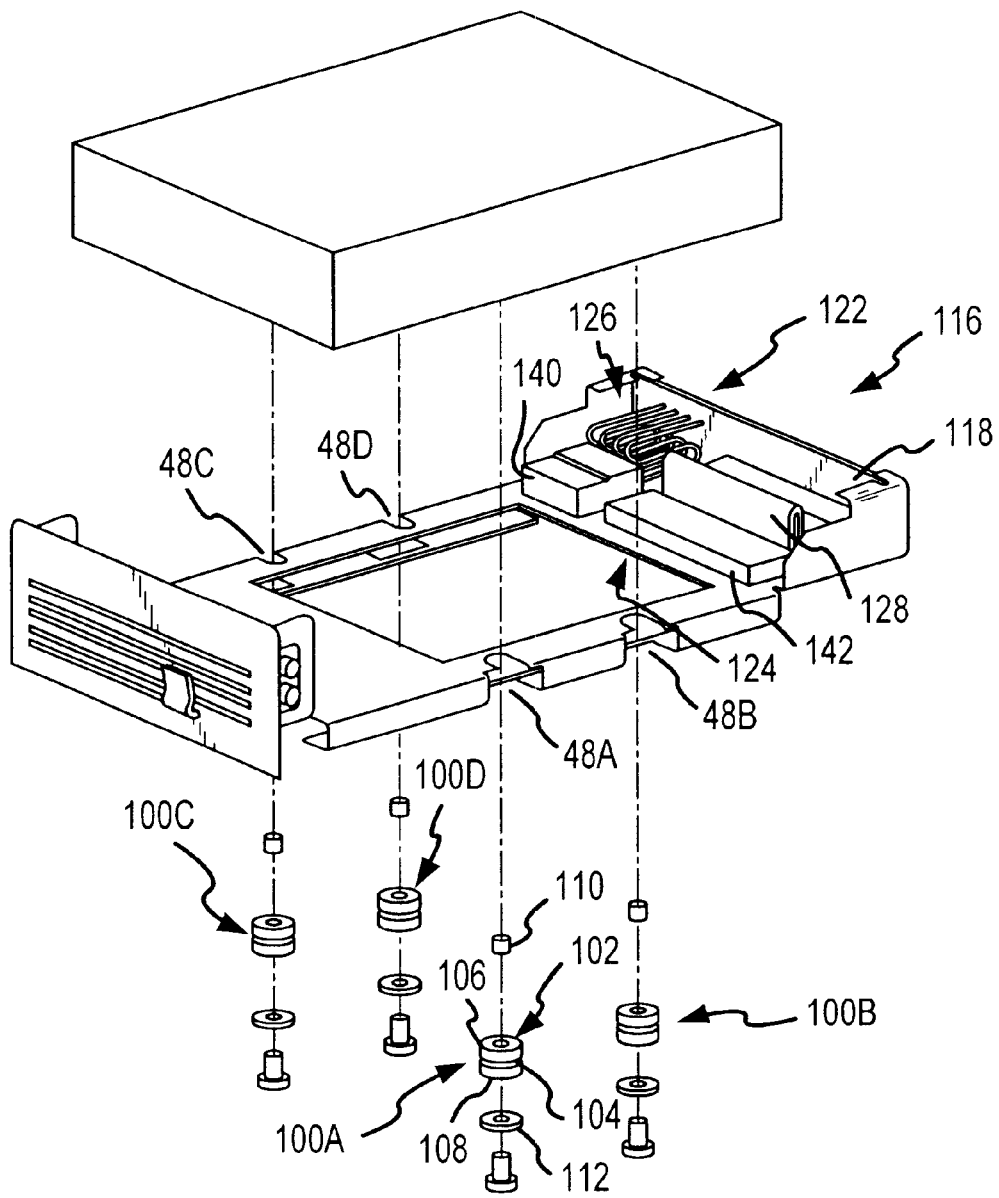
FIG. 9A is an exploded view of a vibration isolation structure that is used isolate data storage devices within the system from vibrations that can adversely affect performance.
Figure 9B:
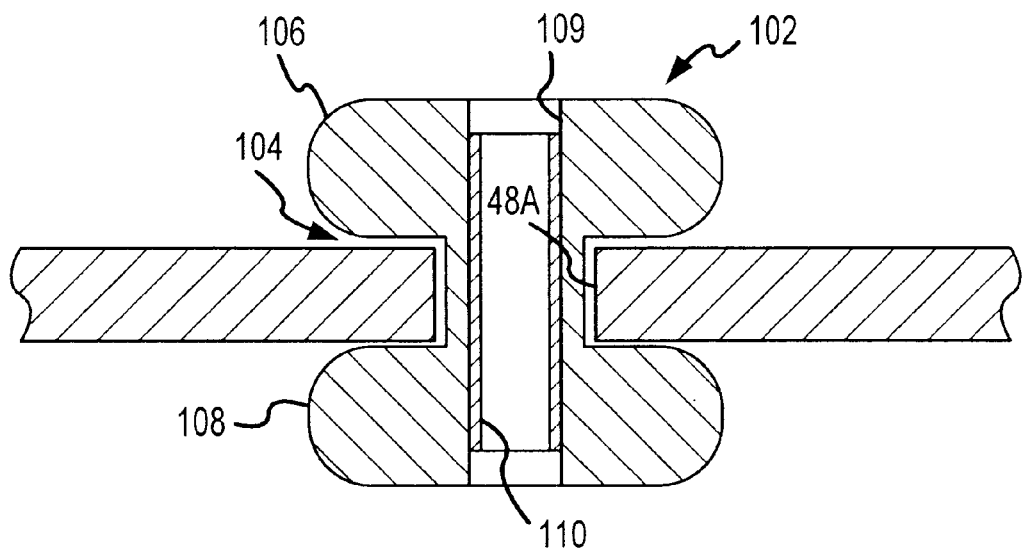
FIG. 9B is a cross-sectional view of an elastomeric torus and cylinder that form a portion of the vibration attention isolation structure shown in FIG. 9A.

With reference to FIGS. 9A and 9B, a structure for isolating a data storage device 58 from vibrations transmitted by the carriage 36 is described. One possible source of vibrations in the system 10 that can adversely affect the operation of data storage devices that are housed within the enclosure 14 and sensitive to vibrations (such as disk drives and tape drives) is vibrations that are transmitted through the carriage 36 to the associated data storage device. To attenuate such vibrations, damping structures 100A–100D are provided that extend between the carriage 36 and an associated data storage device 58. Since the damping structures 100A–100D are substantially identical to one another, only damping structure 100A is described. In the illustrated embodiment, the damping structure 100A includes an elastomeric torus 102 for absorbing vibrations from the carriage 36. The elastomeric torus 102 includes has a circumferential slit 104 that accommodates the portion of the carriage adjacent to the notch 48A and serves to hold the torus 102 in place on the carriage 36. In addition, the circumferential slit 104 divides the torus 102 into an upper half 106 that is disposed between the carriage 36 and any associated data storage device and a lower half 108 that is separated from any such data storage device by the carriage 36. Located within the hole 109 of the torus 102 is a cylinder 110 that serves to protect the elastomeric torus 102 from the threads of the screw or other attachment device that is used to attach the data storage device 58 to the carriage 36. The cylinder 110 has a length that is slightly less than the length of the hole 109. Consequently, when the screw is tightened, the vertical compression of the torus 102 is limited by the cylinder 110. A washer 112 is used to protect the elastomeric torus 102 from the head of the screw or other fastening device. Alternatively, a screw with a broad head is employed that eliminates the need for the washer 112.

Figure 9C:
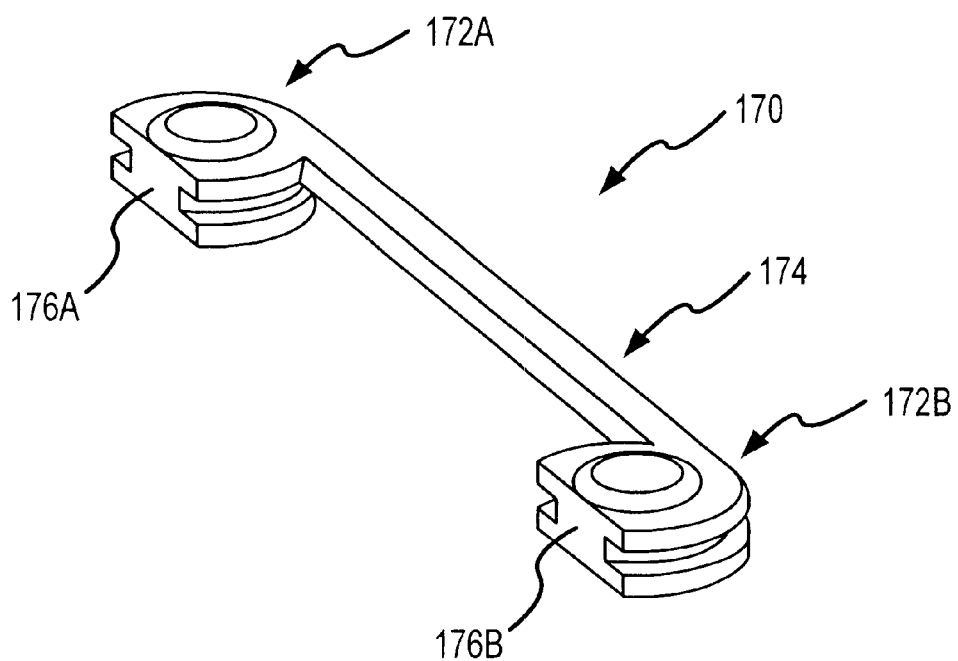
FIG. 9C illustrates a second embodiment of a vibration isolation structure that includes two, elastomeric torus-like structures that are connected to one another.

With reference to FIG. 9C, an alternative dampening structure 170 for use attenuating vibrations that may adversely affect the data storage device 58 is shown. The dampening structure 170 includes first and second torus-like structures 172A, 172B that are made of an elastomeric material and joined together by a bridge 174. The structure 170 is adapted so that the first torus-like structure 172A engages the notch 48A and the second torus-like structure 172B engages notch 48B. The bridge 174, when the first and second torus-like structure 172A, 172B are respectively seated in the notches 48A, 48B, is in tension and, as a consequence, creates friction between the tori and the notches that prevent the tori from slipping out of the notches. The first and second torus-like structures 172A, 172B also respectively have first and second flat sides 176A, 176B that, when the structure 170 is attached to the carriage 36, are substantially flush with the edge of the carriage. As a consequence, the first and second torus-like structures, occupy little, if any, of the space between carriages or between a carriage and one of the first and second side walls 20A, 208. The dampening structure also includes cylinders (not shown) that are substantially identical to the cylinder 110. Generally, a structure that is substantially identical to structure 170 engages notches 48C and 48D.

With continuing reference to FIG. 9A, a second possible source of vibrations that can adversely affect the operation of a data storage device in the system 10 is/are the electrical connector/connectors that extend between the device and other electronic componentry, such as a power supply or buss card. Generally, an electrical connector is provided that attenuates such vibrations using a flexible electrical conductor that has a U-shape. In the illustrated embodiment, an electrical connector 116 is provided that is capable of attenuating vibrations from the electrical connectors to which a data storage device is connected. The electrical connector 116 includes a card 118 that fits within a slot associated with the carriage 36 that is defined by slits 120A–120C (see FIG. 4). Located on the side of the card 118 disposed immediately adjacent to any data storage device associated with the carrier 36 are one or more flexible electrical conductors 122 that extend from the card 118 to one or more electrical terminals 124 that are adapted to engage the mating terminals associated with the data storage device. Each of the flexible electrical conductors has a U-shape that serves to attenuate vibrations produced by the electrical circuitry to which the data storage device is connected before the vibrations reach the device. The flexibility of the connectors also contribute to vibration attenuation. In the illustrated embodiment, each of a set of four electrical conductors 126 that are used to provide power to an IDE disk drive have an S-shape (a shape that embodies two U-shapes) that serves to attenuate vibrations. Further, a split, flexible, flat cable conductor 128 with a U or omega-shape is used to transfer data to and from the IDE disk drive while also attenuating vibrations.

With continuing reference to FIG. 9A, the system 10 is also capable of being readily adapted to types of data storage devices with electrical interfaces whose locations vary from manufacturer to manufacturer. For example, IDE disk drives must have two interfaces located on the back wall of the drive, a power interface and data interface. However, the locations of the interfaces vary from manufacturer to manufacturer. Generally, to address such situations, an electrical connector is provided with a first interface for engaging a mating interface on the data storage device, a substantially fixed interface for engaging the buss card located in the electronics bay 30 of the system, and a flexible electrical conductor extending between the two interfaces. With such a connector variations in the position of the mating interface of the data storage device can be accommodated, while the fixed interface eliminates any need to reposition the buss card interface.

Figure 10:
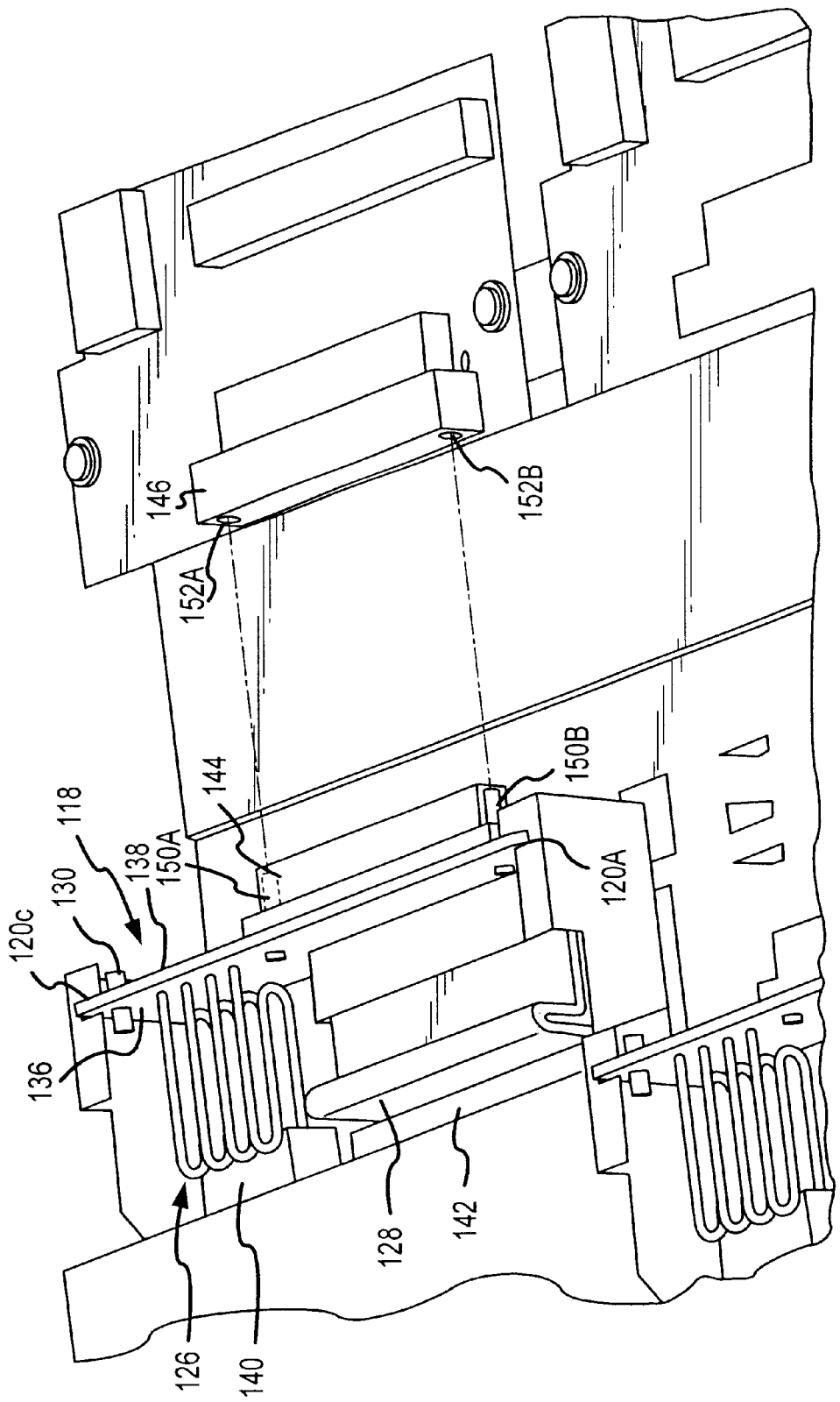
FIG. 10 illustrated the electrical interface between the carriage and a buss card.
Figure 11:
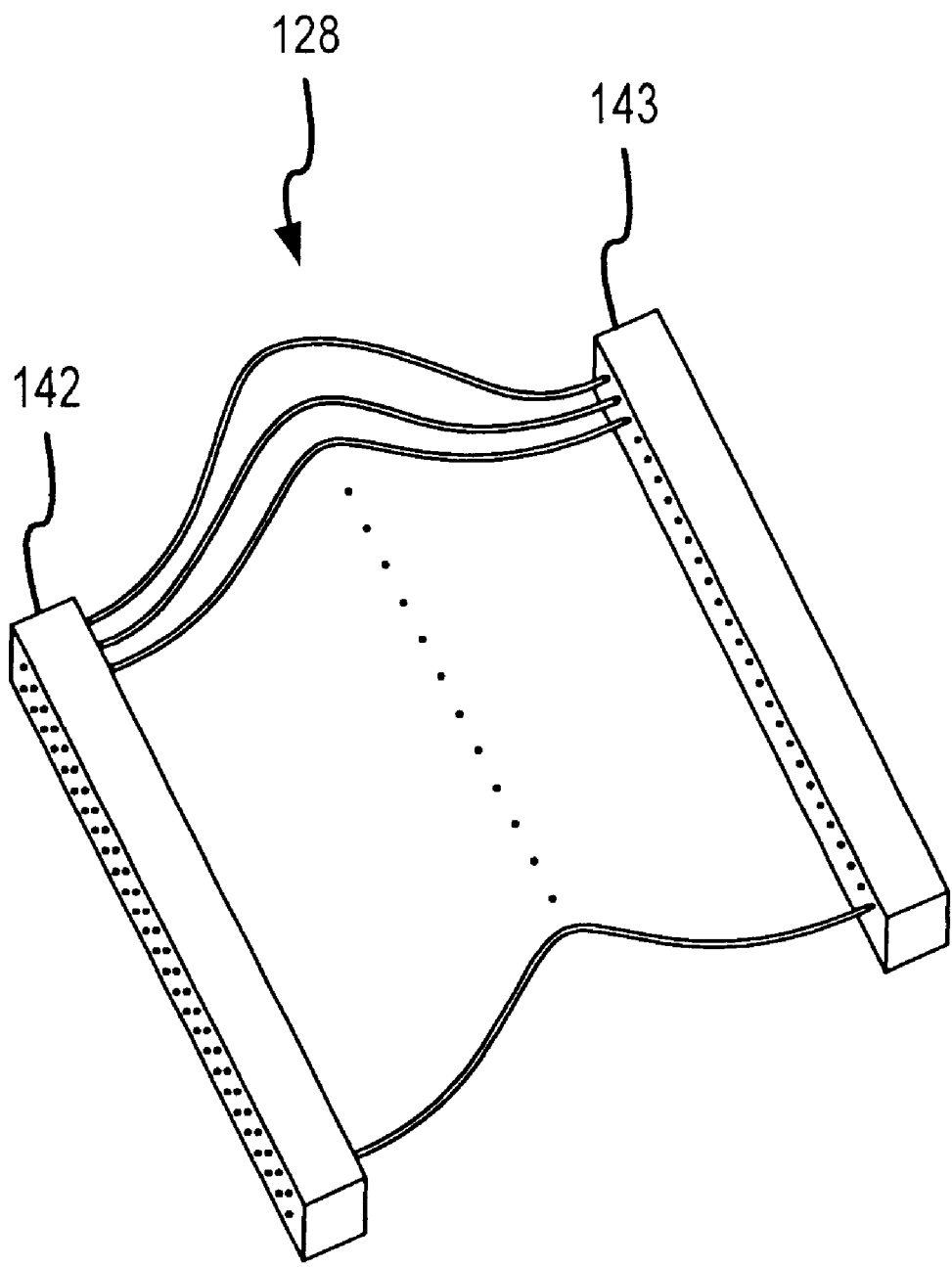
FIG. 11 illustrates a split, flat cable with end connectors that is used to transfer data to and from a data storage unit.

In the illustrated embodiment, the electrical connector 116 provides this capability for an IDE disk drive, which has power and data interfaces whose positions can vary from manufacturer to manufacturer. With reference to FIGS. 9A and 10, the electrical connector includes the card 118 with a first side 136 and a second side 138. The card 118 is located in the slot formed by the slits 120A–120C and, as a consequence, is substantially fixed in place, although capable of some lateral and vertical movement. The card 118 is disposed in the slot such that the first side 136 is proximal any data storage device being held by the carriage 36 and the second side 138 is distal from any such data storage device. Extending from the first side 136 of the card 118 are the set of four conductors 126 that provide power to an IDE drive. The conductors extend to a first power terminal 140 that is configured to mate with a second power terminal located on the back wall of the IDE disk drive. To accommodate variations in the position of the second power terminal, the four conductors 126 are flexible to aid in the attenuation of vibrations. Further, each of the four conductors 126 has an S-shape that serves to attenuate any vibrations being transmitted by the conductor that could adversely affect the operation of the disk drive. Also extending from the first side 136 of the card 118 is the split, flat cable conductor 128 that is used to transfer data to and from an IDE disk drive. The flat cable conductor 128 extends from a first data terminal 142 that is configured to mate with a data terminal located on the back wall of the IDE disk drive to a second data terminal 143 that mates with another terminal located on the card 118. The flexibility of the split, flat cable conductor 128 allows variations in the location of the second data terminal to be addressed. The split characteristic particularly facilitates lateral displacement of the terminals 142, 143 to accommodate horizontal variations in the location of the second data terminal, especially when the split, flat cable conductor 128 is relatively short (e.g., a few inches). The split characteristic also aids in the attenuation of vibrations that can adversely affect the performance of the data storage device attached to the carriage. Further, the split, flat cable conductor 128 has an omega-shape that aids in attenuating vibrations being transmitted by the conductor that could have an undesirable impact on the operation of the drive. The split, flat cable conductor 128 is realized by splitting a multiple conductor flat cable except for the ends. The ends are kept joined so as to facilitate connection to the terminals 142, 143. Located on the second side 138 of the card 118 is a third terminal 144 that is electrically connected to the set of four electrical conductors 126 and the flat cable conductor 128. The third terminal is located so as to be able to mate with a buss card terminal 146 that is in a fixed location when the carriage 36 is inserted into the enclosure 14.

The system 10 also accommodates variations in the positions of the terminal or terminals located on the second side 138 of the card and the terminal or terminals associated with a buss card or other electronics. In the illustrated embodiment, the third terminal 144 includes a pair of pins 150A, 150B, and the 146 buss terminal includes a pair of funnel-shaped holes 151, 152A, 152B for receiving the pins 150A, 150B when the carriage 36 is inserted into the enclosure 14. In operation, the pins 150A, 150B engage the surfaces of funnel-shaped holes 152A, 152B, which force the pins 150A, 150B towards the center of the holes 152A, 152B as the carriage 36 is inserted so that the third terminal 144 mates with the buss card terminal 146. The pins 150A, 150B are capable of moving in this manner because the card 118 is capable of limited vertical and horizontal movement within the slot defined by the slits 120A–120C. To elaborate, the slits 120A, 120C define the width of the slot that accommodates the card 118 and are slightly wider that the width of the card 118. Consequently, the card 118 can move laterally if needed when the pins 150A, 150B engage the funnel shaped holes 152A, 152B. With respect to vertical movement of the card 118, the card 118 includes a first pin 130 and a second pin (not shown) that, when the card 118 is in the slot ,are located below and spaced form the eaves 132A, 132B. This spacing permits the card 118 to move vertically when the pins 150A, 150B engage the funnel shaped holes 152A, 152B.

The foregoing description of the invention has been presented for purposes of illustration and description. Further, the description is not intended to limit the invention to the form disclosed herein. Consequently, variations and modifications commensurate with the above teachings, and the skill or knowledge in the relevant art are within the scope of the present invention. The embodiment described hereinabove is further intended to explain the best mode known of practicing the invention and to enable others skilled in the art to utilize the invention in various embodiments and with the various modifications required by their particular applications or uses of the invention. It is intended that the appended claims be construed to include alternate embodiments to the extent permitted by the prior art.

What is claimed is:

1. A network attached storage device comprising:
    an enclosure having a front side, a rear side that is substantially parallel to said front side, a first lateral side, a second lateral side that is substantially parallel to said first lateral side, a top side, and a bottom side that is substantially parallel to said top side;
    wherein said first lateral side is separated from said second lateral side by approximately 450 mm;
    wherein said top side is separated from said bottom side by no more than approximately 88.9 mm;
    at least four mounting bays that are located in a single row extending between said first lateral side and said second lateral side, with each of said at least four mounting bays capable of supporting a data storage device;
    wherein each of said four mounting bays are accessible from said front side of said enclosure; and
    an interface for connecting the device to a network and a supply of power.

2. A network attached storage device, as claimed in clam 1, wherein:
    at least one of said at least four mounting bays includes a rail extending from one of said top side and said bottom side, and a carriage for holding a data storage device, said carriage including a slot for slidably engaging said rail; wherein, when a data storage device is operatively attached to said carriage, at least one of said rail and said carriage is substantially located between the data storage device and one of said top side and said bottom side.

3. A network attached storage device, as claimed in claim 1, wherein:
    said top side is separated from said bottom side by no more than approximately 44.45 mm.

4. A network attached storage device, as claimed in claim 1, further comprising:
    a vibration dampener that includes a first electrical connector for mating with an second electrical connector of a data storage device, wherein said first electrical connector includes an electrical conductor with at least one of the following: a U-shaped bend and a plurality of flat cable conductors.

5. A network attached storage device, as claimed in claim 1, further comprising:
    an electrical connector for providing an electrical connection between an IDE data storage device and a buss card, said electrical connector includes a first connector for engaging a first interface on an IDE data storage device, a second connector for engaging a second interface on an IDE data storage device, a third connector for engaging a buss card, a first flexible electrical conductor extending between said first connector and said third connector and that accommodates variations in the position of the first interface on an IDE data storage device, and a second flexible electrical conductor extending between said second connector and said third connector and that accommodates variations in the position of the second interface on an IDE data storage device;
    wherein at least one of said first and second flexible electrical conductors includes a plurality of flat cable conductors.

6. A network attached storage device, as claimed in claim 2, wherein:
    both of said rail and said carriage are substantially located between the data storage device and one of said top side and said bottom side.

7. A network attached storage device, as claimed in claim 2, wherein:
    said rail includes a first pair of opposing L-shaped legs;
    said slot includes a second pair of opposing L-shaped legs;
    wherein, when said slot is engaging said rail, first portions of said first pair of opposing L-shaped legs engage second portions of said second pair of opposing L-shaped legs;

wherein, when a data storage device is operatively attached to said carriage and said slot is engaging said rail, said first and second portions are substantially located between the data storage device and one of said top side and said bottom side.

8. A network attached storage device, as claimed in claim 2, further comprising:

a latch that allows a user to attach and detach said carriage to and from said enclosure, wherein said latch includes a latch actuator, a latch pin that is positioned to be engaged by said latch actuator to operatively attach said carriage to said enclosure, and a sensor for sensing movement of said latch actuator and providing an electrical signed representative of movement of said latch actuator that occurs before an electrical connection between said carriage and an electrical device located within said enclosure is broken.

9. A network attached storage device, as claimed in claim 2, further comprising:

a vibration dampener that includes an elastomeric mount for isolating a data storage device from vibrations, said elastomeric mount, when a data storage device is attached to one of said at least four carriages, extends between the data storage device and said one of said at least four carriages.

10. A network attached storage device comprising:

an enclosure having a front side, a rear side that is substantially parallel to said front side, a first lateral side, a second lateral side that is substantially parallel to said first lateral side, a top side, and a bottom side that is substantially parallel to said top side;

a mounting bay that is located within said enclosure and capable of supporting at least one data storage device, wherein said mounting bay includes a receiving bay that is operatively associated with said enclosure and a carriage for holding a data storage device;

wherein said receiving bay includes a rail;

wherein said carriage includes a slot for slidably engaging said rail;

wherein said receiving bay is accessible from said front side of said enclosure;

wherein, when a data storage device is operatively attached to said carriage, at least one of said rail and said carriage is substantially located between the data storage device and one of said top side and said bottom side; and an interface for connecting the device to a network and a supply of power.

11. A network attached storage device, as claimed in claim 10, wherein:

both of said rail and said carriage are substantially located between the data storage device and one of said top side and said bottom side.

12. A network attached storage device, as claimed in claim 10, wherein:

said rail includes a first pair of opposing L-shaped legs;

said slot includes a second pair of opposing L-shaped legs;

wherein, when said slot is engaging said rail, first portions of said first pair of opposing L-shaped legs engage second portions of said second pair of opposing L-shaped legs;

wherein, when a data storage device is operatively attached to said carriage and said slot is engaging said rail, said first and second portions are substantially located between the data storage device and one of said top side and said bottom side.

13. A network attached storage device, as claimed in claim 10, wherein:

said first lateral side is separated from said second lateral side by 450 mm; and said top side is separated from said bottom side by no more than approximately 88.9 mm.

14. A network attached storage device, as claimed in claim 10, further comprising:

a latch that allows a user to attach and detach said carriage to and from said enclosure, wherein said latch includes a latch actuator, a latch pin that is positioned to be engaged by said latch actuator to operatively attach said carriage to said enclosure, and a sensor for sensing movement of said latch actuator and providing an electrical signed representative of movement of said latch actuator that occurs before an electrical connection between said carriage and an electrical device located within said enclosure is broken.

15. A network attached storage device, as claimed in claim 10, further comprising:

a vibration dampener that includes an elastomeric mount for isolating a data storage device from vibrations, said elastomeric mount, when a data storage device is attached to said carriage, extends between the data storage device and said carriage.

16. A network attached storage device, as claimed in claim 10, further comprising:

a vibration dampener that includes a first electrical connector for mating with a second electrical connector of a data storage device, wherein said first electrical connector includes an electrical conductor with at least one of the following: a U-shaped bend and a plurality of flat cable conductors.

17. A network attached storage device, as claimed in claim 10, further comprising:

an electrical connector for providing an electrical connection between an IDE data storage device and a buss card, said electrical connector includes a first connector for engaging a first interface on an IDE data storage device, a second connector for engaging a second interface on an IDE data storage device, a third connector for engaging a buss card, a first flexible electrical conductor extending between said first connector and said third connector and that accommodates variations in the position of the first interface on an IDE data storage device, and a second flexible electrical conductor extending between said second connector and said third connector and that accommodates variations in the position of the second interface on an IDE data storage device;

wherein at least one of said first and second flexible electrical conductors includes a plurality of flat cable conductors.

18. A network attached storage device, as claimed in claim 13, wherein:

said top side is separated from said bottom side by no more than approximately 44.45 mm and four of said mounting bay are located in a single row extending between said first lateral side and said second lateral side.

19. A network attached storage device comprising:

an enclosure having a front side, a rear side that is substantially parallel to said front side, a first lateral side, a second lateral side that is substantially parallel to said first lateral side, a top side, and a bottom side that is substantially parallel to said top side;

a mounting bay located within said enclosure and capable of supporting at least one data storage device, wherein said mounting bay includes a receiving bay that is operatively associated with said enclosure and a carriage for holding a data storage device;

a latch that allows a user to attach or detach a carriage to or from said enclosure, said latch includes a latch actuator that is moveable between first and second positions, a latch pin that is positioned so as to be engaged by said latch actuator to attach said carriage to said enclosure, and a sensor for sensing movement of said latch actuator and providing an electrical signal representative of movement of said latch actuator that occurs before an electrical connection between said carriage and an electrical device located within said enclosure is broken; and an interface for connecting the device to a network and a supply of power.

20. A network attached storage device, as claimed in claim 19, wherein:

when said latch actuator and said latch pin are engaged so as to cause said carriage to be mechanically attached to said enclosure, said latch actuator and said latch pin have a point of contact that is located between first and second locations on said latch actuator; and wherein said sensor is adapted to detect movement of said latch actuator that causes said point of contact to move between said first and second locations.

21. A network attached storage device, as claimed in claim 19, wherein:

said latch actuator includes an edge that defines at least a portion of a slot that is capable of receiving said latch pin;

wherein when said latch actuator and said latch pin are engaged so as to cause said carriage to be mechanically attached to said enclosure, said latch actuator and said latch pin have a point of contact that is between first and second locations on said edge;

wherein said sensor is adapted to detect movement of said latch actuator that causes said point of contact to move between said first and second locations.

22. A network attached storage device, as claimed in claim 19, wherein:

said sensor includes a mechanical switch.

23. A network attached storage device, as claimed in claim 19, wherein:

said first lateral side is separated from said second lateral side by 450 mm;

said mounting bay includes four receiving bays and four carriages that are located in a single row extending between said first and second lateral sides, each of said four carriages capable of engaging one of said four receiving bays and supporting a data storage device.

24. A network attached storage device, as claimed in claim 19, wherein:

said receiving bay includes a rail extending from one of said top side and said bottom side;

said carriage includes a slot for slidably engaging said rail;

wherein, when a data storage device is operatively attached to said carriage and said carriage is operatively engaging said rail, both said rail and said carriage are substantially located between the data storage device and one of said top side and said bottom side.

25. A network attached storage device, as claimed in claim 19, further comprising:

a vibration dampener that includes an elastomeric mount for isolating a data storage device from vibrations, said elastomeric mount, when a data storage device is attached to said carriage, extends between the data storage device and said carriage.

26. A network attached storage device, as claimed in claim 19, further comprising:

a vibration dampener that includes a first electrical connector for mating with a second electrical connector of a data storage device, wherein said first electrical connector includes an electrical conductor with one of the following: a U-shaped bend and a plurality of flat cable conductors.

27. A network attached storage device, as claimed in claim 19, further comprising:

an electrical connector for providing an electrical connection between an IDE data storage device and a buss card, said electrical connector includes a first connector for engaging a first interface on an IDE data storage device, a second connector for engaging a second interface on an IDE data storage device, a third connector for engaging a buss card, a first flexible electrical conductor extending between said first connector and said third connector for accommodating variations in the position of the first interface on an IDE data storage device, and a second flexible electrical conductor extending between said second connector and said third connector for accommodating variations in the position of the second interface on an IDE data storage device; wherein at least one of said first and second flexible electrical conductors includes a plurality of flat cable conductors.

28. A network attached storage device comprising:

an enclosure having a front side, a rear side that is substantially parallel to said front side, a first lateral side, a second lateral side that is substantially parallel to said first lateral side, a top side, and a bottom side that is substantially parallel to said top side;

a mounting bay located within said enclosure and capable of supporting at least one data storage device, wherein said mounting bay includes a receiving bay that is operatively associated with said enclosure and a carriage for holding a data storage device;

a vibration dampener for, when a data storage device is attached to said carriage, isolating the data storage device from vibrations that may adversely affect the operation of the device, wherein said vibration dampener includes an elastomeric mount that extends, when a data storage device is attached to said carriage, between the data storage device and said carriage; and an interface for connecting the device to a network and a supply of power.

29. A network attached storage device, as claimed in claim 28, wherein:

said elastomeric mount includes an elastomeric torus-like structure that, when a data storage device is attached to said carriage, surrounds a connector that is used to attach the data storage device to said carriage.

30. A network attached storage device, as claimed in claim 28, wherein:

said elastomeric mount includes an elastomeric torus-like structure with a first portion located, when a data storage device is attached to said carriage, between said carriage and the data storage device and a second portion that is separated from the data storage device by a portion of said carriage.

31. A network attached storage device, as claimed in claim 28, wherein:
said elastomeric mount includes a first torus-like structure, a second torus-like structure, and a bridge connecting said first torus-like structure to said second torus-like structure.

32. A network attached storage device, as claimed in claim 28, wherein:
said first lateral side is separated from said second lateral side by 450 mm;
said mounting bay includes four receiving bays and four carriages that are located in a single row extending between said first and second lateral sides, each of said four carriages capable of engaging one of said receiving bays and supporting a data storage device.

33. A network attached storage device, as claimed in claim 28, wherein:
said receiving bay includes a rail extending from one of said top side and said bottom side;
said carriage includes a slot for slidably engaging said rail;
wherein, when a data storage device is operatively attached to said carriage and said carriage is operatively engaging said rail, both said rail and said carriage are substantially located between the data storage device and one of said top side and said bottom side.

34. A network attached storage device, as claimed in claim 28, further comprising:
a latch that allows a user to attach or detach a carriage to and from said enclosure, wherein said latch includes a latch actuator, a latch pin positioned so as to be engaged by said latch actuator to attach said carriage to said enclosure, and a sensor for sensing movement of said latch actuator and providing an electrical signal representative of movement of said latch actuator that occurs before an electrical connection between said carriage and an electrical device locating within said enclosure is broken.

35. A network attached storage device, as claimed in claim 28, wherein:
said vibration dampener includes a first electrical connector for mating with a second electrical connector of a data storage device, wherein said first electrical connector includes an electrical conductor with at least one of the following: a U-shaped bend and a plurality of flat cable conductors.

36. A network attached storage device, as claimed in claim 28, further comprising:
an electrical connector for providing an electrical connection between an IDE data storage device and a buss card, said electrical connector includes a first connector for engaging a first interface on an IDE data storage device, a second connector for engaging a second interface on an IDE data storage device, a third connector for engaging a buss card, a first flexible electrical conductor extending between said first connector and said third connector for accommodating variations in the position of the first interface on an IDE data storage device, and a second flexible electrical conductor extending between said second connector and said third connector for accommodating variations in the position of the second interface on an IDE data storage device; and
wherein at least one of said first and second flexible electrical conductors includes a plurality of flat cable conductors.

37. A network attached storage device, as claimed in claim 29, wherein:
said vibration dampener includes a cylinder located inside said elastomeric torus-like structure.

38. A network attached storage device, as claimed in claim 29, wherein:
said elastomeric torus-like structure has an outer surface with a flat portion.

39. A network attached storage device comprising:
an enclosure having a front side, a rear side that is substantially parallel to said front side, a first lateral side, a second lateral side that is substantially parallel to said first lateral side, a top side, and a bottom side that is substantially parallel to said top side;
a mounting bay located within said enclosure and capable of supporting at least one data storage device, wherein said mounting bays includes a receiving bay that is operatively attached to said enclosure and a carriage for holding a data storage device;
a vibration dampener for, when a data storage device is attached to said carriage, dampening vibrations that may adversely affect the operation of the data storage device, wherein said vibration dampener includes an electrical connector that, when a data storage device is attached to said carriage, is located between the data storage device and a buss card and is capable of dampening vibrations; and
an interface for connecting the device to a network and a supply of power.

40. A network attached storage device, as claimed in claim 39, wherein:
said electrical connector includes a plurality of flat cable conductors.

41. A network attached storage device, as claimed in claim 39, wherein: said electrical connector includes an electrical conductor with an S-shaped bend.

42. A network attached storage device, as claimed in claim 39, wherein: said electrical connector includes an electrical conductor with a U-shaped bend.

43. A network attached storage device, as claimed in claim 39, wherein:
said first lateral side is separated from said second lateral side by 450 mm;
said mounting bay includes four receiving bays and four carriages that are located in a single row extending between said first and second lateral sides, each of said four carriages capable of engaging one of said four receiving bays and supporting a data storage device.

44. A network attached storage device, as claimed in claim 39, wherein:
said receiving bay includes a rail extending from one of said top side and said bottom side;
said carriage includes a slot for slidably engaging said rail;
wherein, when a data storage device is operatively attached to said carriage and said carriage is operatively engaging said rail, both said rail and said carriage are substantially located between the data storage device and one of said top side and said bottom side.

45. A network attached storage device, as claimed in claim 39, further comprising:
a latch that allows a user to attach or detach a carriage to and from said enclosure, wherein said latch includes a latch actuator, a latch pin positioned so as to be engaged by said latch actuator to attach said carriage to said enclosure, and a sensor for sensing movement of said latch actuator and providing an electrical signal representative of movement of said latch actuator that occurs before an electrical connection between said carriage and an electrical device located within said enclosure is broken.

46. A network attached storage device, as claimed in claim 39, wherein:
said vibration dampener includes an elastomeric mount that extends, when a data storage device is attached to said carriage, between the data storage device and said carriage.

47. A network attached storage device, as claimed in claim 39, further comprising:
an electrical connector for providing an electrical connection between an IDE data storage device and a buss card, said electrical connector includes a first connector for engaging a first interface on an IDE data storage device, a second connector for engaging a second interface on an IDE data storage device, a third connector for engaging a buss card, a first flexible electrical conductor extending between said first connector and said third connector for accommodating variations in the position of the first interface on an IDE data storage device, and a second flexible electrical conductor extending between said second connector and said third connector for accommodating variations in the position of the second interface on an IDE data storage device; wherein at least one of said first and second flexible electrical conductors includes a plurality of flat cable conductors.

48. A network attached storage device comprising:
an enclosure having a front side, a rear side that is substantially parallel to said front side, a first lateral side, a second lateral side that is substantially parallel to said first lateral side, a top side, and a bottom side that is substantially parallel to said top side;
a mounting bay located within said enclosure, wherein said mounting bay is capable of supporting at least one data storage device, wherein said mounting bay includes a receiving bay that is operatively attached to said enclosure and a carriage for holding a data storage device;
an electrical connector for providing an electrical connection between an IDE data storage device and a buss card, said electrical connector includes a first connector for engaging a first interface on an IDE data storage device, a second connector for engaging a second interface on an IDE data storage device, a third connector for engaging a buss card, a first flexible electrical conductor extending between said first connector and said third connector for accommodating variations in the position of the first interface on an IDE data storage device, and a second flexible electrical conductor extending between said second connector and said third connector for accommodating variations in the position of the second interface on an IDE data storage device; wherein at least one of said first and second flexible electrical conductors includes a plurality of flat cable conductors; and
an interface for connecting the device to a network and a supply of power.

49. A network attached storage device, as claimed in claim 48, wherein:
each of said plurality of flat cable conductors is mechanically connected to the other of said plurality of flat cable conductors both a first end of each of said plurality of flat cable conductors and at a second end of each of said plurality of flat cable conductors.

50. A network attached storage device, as claimed in claim 48, wherein:
each of said plurality of flat cable conductors is no longer than approximately 76 mm.

51. A network attached storage device, as claimed in claim 48, wherein:
said first lateral side is separated from said second lateral side by 480 mm;
said mounting bay includes four receiving bays and four carriages that are located in a single row extending between said first and second lateral sides, each of said four carriages capable of engaging one of said four receiving bays and supporting a data storage device.

52. A network attached storage device, as claimed in claim 48, wherein:
said receiving bay includes a rail extending from one of said top side and said bottom side;
said carriage includes a slot for slidably engaging said rail;
wherein, when a data storage device is operatively attached to said carriage and said carriage is operatively engaging said rail, both said rail and said carriage are substantially located between the data storage device and one of said top side and said bottom side.

53. A network attached storage device, as claimed in claim 48, further comprising:
a latch that allows a user to attach or detach a carriage to and from said enclosure, wherein said latch includes a latch actuator, a latch pin positioned so as to be engaged by said latch actuator to attach said carriage to said enclosure, and a sensor for sensing movement of said latch actuator and providing an electrical signal representative of movement of said latch actuator that occurs before an electrical connection between said carriage and an electrical device located within said enclosure is broken.

54. A network attached storage device, as claimed in claim 48, further comprising:
a vibration dampener that includes an elastomeric mount for isolating a data storage device from vibrations, said elastomeric mount, when a data storage device is attached to said carriage, extends between the data storage device and said carriage.

55. A network attached storage device, as claimed in claim 48, further comprising:
a vibration dampener that includes a first electrical connector for mating with a second electrical connector of a data storage device, wherein said first electrical connector includes an electrical conductor with at least one of the following: a U-shaped bend and a plurality of flat cable conductors.

56. A network attached storage device, as claimed in claim 19, wherein: said sensor includes an optical switch.

* * * * *

UNITED STATES PATENT AND TRADEMARK OFFICE
CERTIFICATE OF CORRECTION

PATENT NO. : 6,392,892 B1
DATED : May 21, 2002
INVENTOR(S) : Sobolewski et al.

It is certified that error appears in the above-identified patent and that said Letters Patent is hereby corrected as shown below:

Column 1,
Line 56, following "system", insert -- . Stated --;

Column 9,
Line 66, following "96", insert -- to --;

Column 11,
Line 46, delete "208" and insert -- 20B --;

Column 12,
Line 45, following "conductors", insert -- 126 --;

Column 13,
Line 21, delete "151,";

Column 16,
Line 6, before "450", insert -- approximately --;

Column 17,
Line 50, before "450", insert -- approximately --;

Column 19,
Line 12, before "450", insert -- approximately --;

Column 20,
Line 44, before "450", insert -- approximately --;

UNITED STATES PATENT AND TRADEMARK OFFICE
CERTIFICATE OF CORRECTION

PATENT NO. : 6,392,892 B1
DATED : May 21, 2002
INVENTOR(S) : Sobolewski et al.

It is certified that error appears in the above-identified patent and that said Letters Patent is hereby corrected as shown below:

<u>Column 22,</u>
Line 15, before "480", insert -- approximately --;

Signed and Sealed this

Twenty-third Day of July, 2002

*Attest:*

*Attesting Officer*

JAMES E. ROGAN
*Director of the United States Patent and Trademark Office*